United States Patent
Fujioka

(10) Patent No.: US 9,747,475 B2
(45) Date of Patent: Aug. 29, 2017

(54) MOBILE VIRTUAL ENVIRONMENT

(71) Applicant: Mattel, Inc., El Segundo, CA (US)

(72) Inventor: Robb Fujioka, Manhattan Beach, CA (US)

(73) Assignee: Mattel, Inc., El Segundo, CA (US)

( * ) Notice: Subject to any disclaimer, the term of this patent is extended or adjusted under 35 U.S.C. 154(b) by 0 days.

(21) Appl. No.: 14/523,396

(22) Filed: Oct. 24, 2014

(65) Prior Publication Data

US 2015/0116094 A1    Apr. 30, 2015

Related U.S. Application Data

(60) Provisional application No. 61/895,343, filed on Oct. 24, 2013.

(51) Int. Cl.
   *G06K 7/10*    (2006.01)
   *G06Q 50/02*   (2012.01)
   *H04M 19/04*   (2006.01)

(52) U.S. Cl.
   CPC .......... *G06K 7/10009* (2013.01); *G06Q 50/02* (2013.01); *H04M 19/04* (2013.01)

(58) Field of Classification Search
   CPC .. G06K 7/10; G06K 7/10009; G06K 7/10366; G06K 19/0677
   USPC ............................................. 340/10.5, 10.51
   See application file for complete search history.

(56) References Cited

U.S. PATENT DOCUMENTS

| | | | |
|---|---|---|---|
| 7,932,830 B2 * | 4/2011 | Campero | G01S 13/82 340/10.2 |
| 2007/0070034 A1 | 3/2007 | Fanning | |
| 2008/0266092 A1 * | 10/2008 | Campero | G01S 13/82 340/572.1 |
| 2009/0124165 A1 | 5/2009 | Weston | |
| 2010/0203932 A1 | 8/2010 | Briggs | |
| 2011/0199211 A1 * | 8/2011 | Campero | G06K 7/0008 340/572.1 |
| 2013/0173658 A1 | 7/2013 | Adelman | |

OTHER PUBLICATIONS

International Search Report for App. No. PCT/US2014/062259, dated Feb. 3, 2015, 1 page.

* cited by examiner

*Primary Examiner* — Allen T Cao

(57) ABSTRACT

A system and method for displaying a virtual experience based on a presence of a physical object is disclosed. According to one embodiment, the system includes a screen, a target, and a reader. The reader detects a presence of the target within a predetermined proximity and communicates with the screen to display a virtual environment based on the presence of the target.

17 Claims, 13 Drawing Sheets

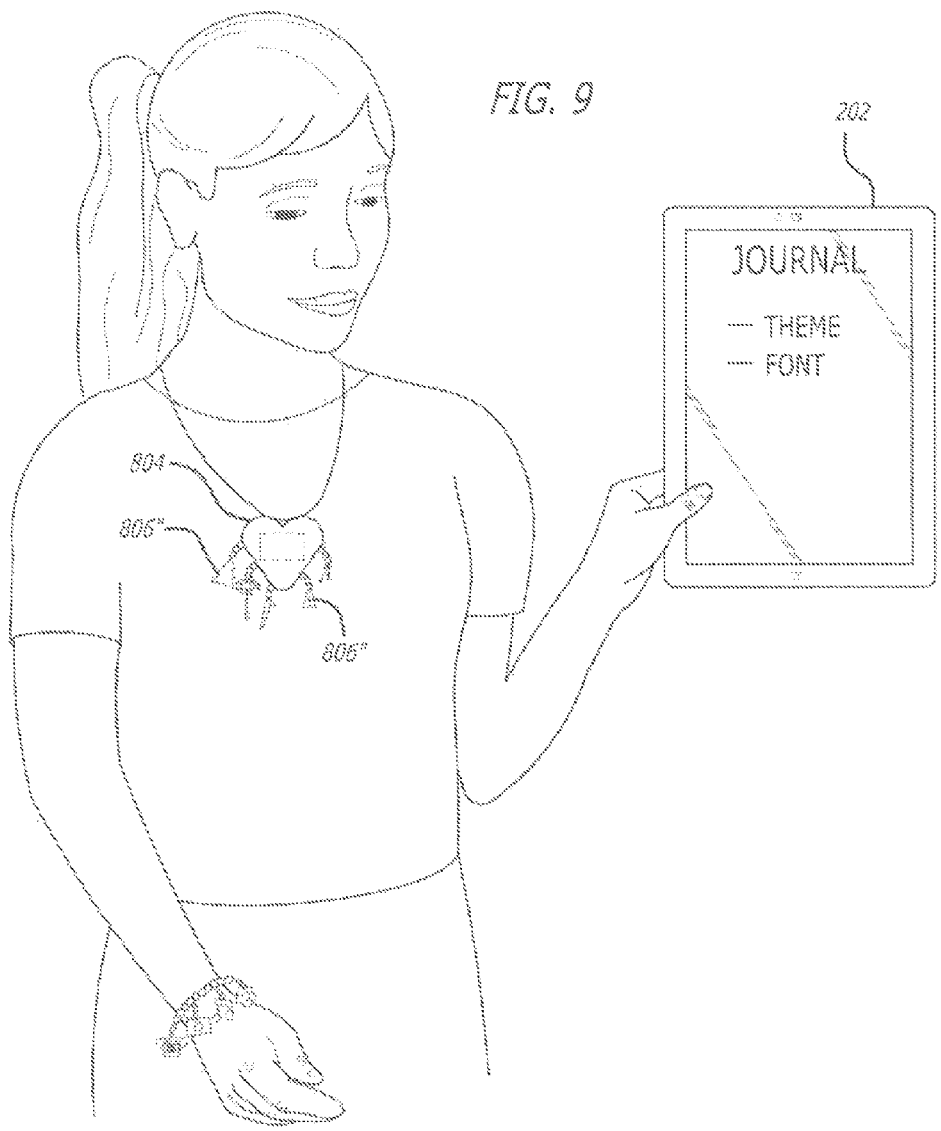

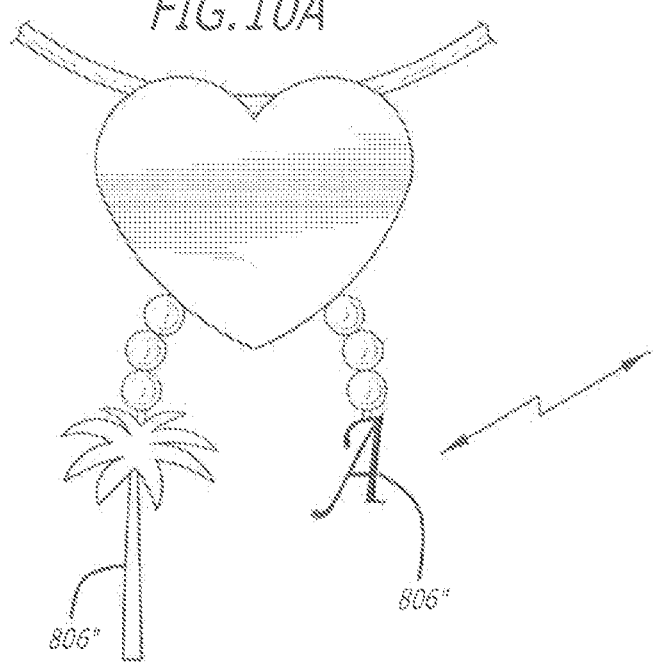
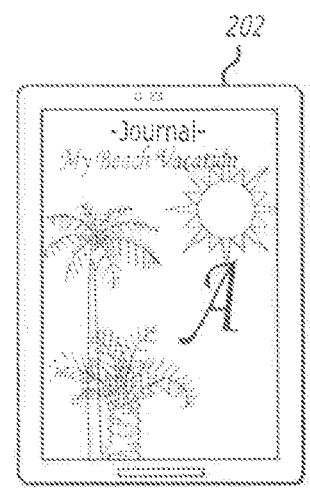
FIG. 10A
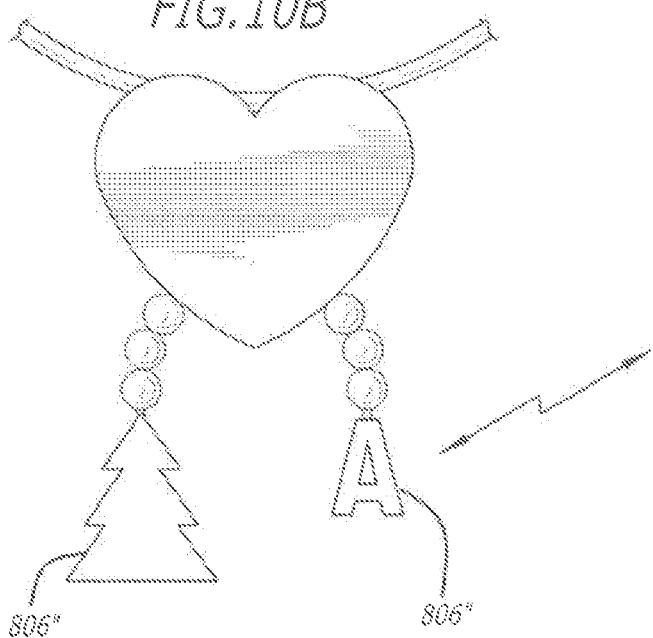
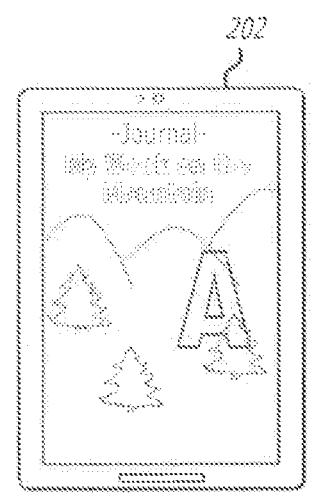
FIG. 10B

MOBILE VIRTUAL ENVIRONMENT

CROSS-REFERENCE TO RELATED APPLICATIONS

The present application claims priority to U.S. Patent Application No. 61/895,343 filed on Oct. 24, 2013, entitled "Mobile Virtual Environment," which is herein incorporated by reference.

FIELD

The present disclosure generally relates to a system and method for providing a virtual mobile environment to a user. More particularly, the field of the present disclosure relates to an apparatus and a method for providing a virtual experience that is made available, unlocked, or enhanced through a combination of physical objects.

BACKGROUND

Gaming consoles provide a virtual experience through the manipulation of a controller. The specific game attributes are stored on a disk or other physical medium that is loaded into a stationary console. The console then reads and interprets the attribute information and displays it to a screen that is coupled to the console. The controller manipulates the images and/or characters displayed on the screen. The console, controller, and display are generally physically linked through one or more cords, cables, or connectors. Thus, in order to play a game, a user needs access to a large space and supporting infrastructure. Specifically, a power supply, such as an AC outlet, is required to power the console and/or display, as well as a space to store the console, cords, connectors, and display. The components needed to engage in a game are generally large, bulky, and/or inconvenient to transport. As such, traditional gaming is generally limited to a single geographic location in which the console resides.

In each case, a game is selected through a physical interface, such as a disk or a cartridge, interacting with a physical console. The selection of a physical object then dictates the attributes of a virtual environment. The physical object generally includes a generic shape that is unrelated to any attribute of the virtual environment associated with that physical object. Instead, words and images may be printed on the physical object, such as a disk, to identify which virtual environment is stored or associated with that physical object. For example, the console may read a disk or cartridge that has the same shape regardless of the associated game stored on the disk or cartridge. The label identifies the actual game to a user.

Alternatively, there are handheld devices that include one or a limited number of games available on a single device. These devices may be configured with controls directly on the device specific for the associated game. For example, a small handheld device may be configured to play poker. In this case, the device may include a screen to display the dealt cards and specific buttons to hold, fold, etc. However, such devices are static and do not permit a user to select beyond the game choices already provided and stored on the device. Tablet computers, smart phones, and other portable smart devices provide a similar experience. A set number of games or choices may be downloaded to the device when connected to a telecommunications signal. If alternative games are to be played then one or more games must be deleted and other games installed and configured. Once deleted, the user cannot reinstall the same game and retain the history associated with the previous gaming experience. Moreover, installation and deletion of games is cumbersome and requires an appropriate data signal to download the desired game. In either a dedicated gaming device or a smart device, a user typically interacts with a single program at a given time without modification or alteration. If another feature is desired, a new program must be downloaded, installed, and executed by the device.

SUMMARY

A system and method for displaying a virtual experience based on a presence of a physical object is disclosed. According to one embodiment, the system includes a screen, a target, and a reader. The reader detects a presence of the target within a predetermined proximity and communicates with the screen to display a virtual environment based on the presence of the target.

The present system and method provides a virtual experience that is made available, unlocked, or enhanced through one or more combinations of physical objects. The virtual experience interface and/or physical objects may be easily transported to initiate the virtual experience from different locations. The physical object may be specifically or independently identifiably shaped, such that each physical object is attributed to one or more attributes of the virtual environment or experience.

According to one embodiment, the present system and method permits one or more physical objects to create a full virtual experience. Additional physical objects may be introduced to change, enhance, or expand the virtual experience. The different interaction of one or more physical objects may create one or more different virtual experiences.

According to one embodiment, the present system and method provides the virtual experience through an interface interacting with one or more physical objects. The physical objects may not need to be physically electrically coupled to a console to engage in the virtual experience. In one embodiment, the physical object wirelessly couples to a display to select the virtual experience. Wireless communication may include light, sound, magnetic, electric, or electromagnetic fields, waves, or particles to communicate between two points not connected by an electrical conductor. For example, wireless communication may involve, but is not limited to, near field communication (NFC), radio frequency identification (RFID), Bluetooth, optical recognition.

DESCRIPTION OF THE DRAWINGS

The accompanying drawings, which are included as part of the present specification, illustrate the various embodiments of the present disclosed system and method and together with the general description given above and the detailed description of the preferred embodiment given below serve to explain and teach the principles of the present disclosure.

FIG. 9 illustrates the interactions of targets, a reader, and a display to create the virtual experience, according to one embodiment;

FIGS. 10A and 10B illustrate different virtual experiences through the different combination of primary and secondary targets, according to some embodiments;

Figure 1:
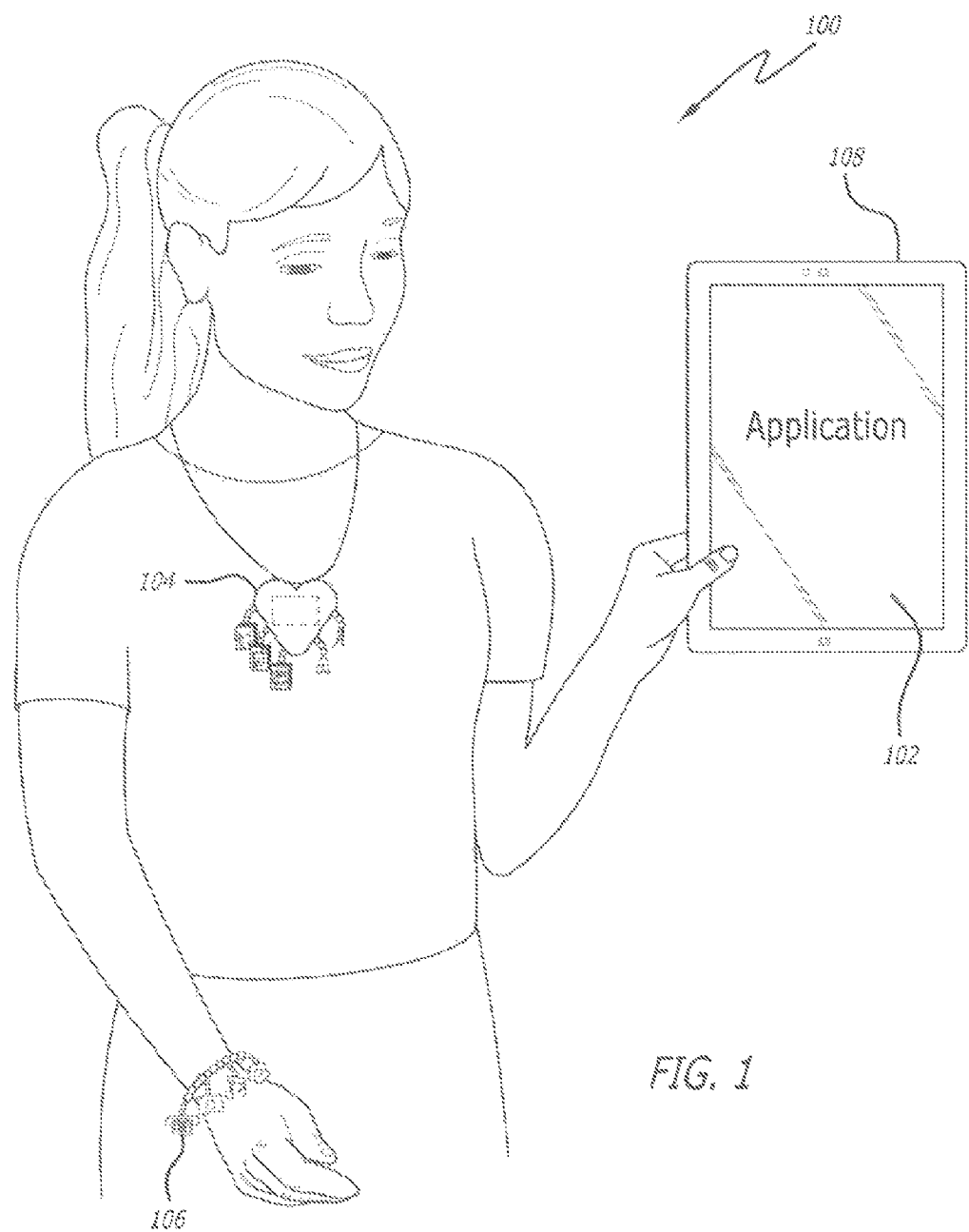
FIG. 1 illustrates an exemplary embodiment of a system for using one or more physical objects to interact with a virtual environment, according to one embodiment.

It should be noted that the figures are not necessarily drawn to scale and that elements of structures or functions are generally represented by reference numerals for illustrative purposes throughout the figures. It also should be noted that the figures are only intended to facilitate the description of the various embodiments described herein. The figures do not describe every aspect of the teachings described herein and do not limit the scope of the claims.

DETAILED DESCRIPTION

A system and method for providing a virtual mobile environment is disclosed.

In the following description, for purposes of clarity and conciseness of the description, not all of the numerous components shown in the schematic are described. The numerous components are shown in the drawings to provide a person of ordinary skill in the art a thorough enabling disclosure of the present system and method. The operation of many of the components would be understood to one skilled in the art.

Each of the additional features and teachings disclosed herein can be utilized separately or in conjunction with other features and teachings to provide a system and method for providing curated content. Representative examples utilizing many of these additional features and teachings, both separately and in combination, are described in further detail with reference to the attached drawings. This detailed description is merely intended to teach a person of skill in the art further details for practicing preferred aspects of the present teachings and is not intended to limit the scope of the present disclosure. Therefore, combinations of features disclosed in the following detailed description may not be necessary to practice the teachings in the broadest sense and are instead taught merely to describe particularly representative examples of the present teachings.

Moreover, various features of the representative examples and the dependent claims may be combined in ways that are not specifically and explicitly enumerated in order to provide additional useful embodiments of the present teachings. In addition, it is expressly noted that all features disclosed in the description and/or the claims are intended to be disclosed separately and independently from each other for the purpose of original disclosure, as well as for the purpose of restricting the claimed subject matter independent of the compositions of the features in the embodiments and/or the claims. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help understand how the present teachings are practiced but are not intended to limit the dimensions and the shapes shown in the examples.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission display devices.

In the following description, numerous specific details are set forth, such as examples of specific data signals, named components, connections, etc., in order to provide a thorough understanding of the present disclosure. It is apparent, however, to one of ordinary skill in the art that the present disclosure may be practiced without these specific details. In other instances, well known components or methods have not been described in detail but rather in a schematic in order to avoid unnecessarily obscuring the present disclosure. Further specific numeric references, such as first status indicator, may be made. However, the specific numeric reference should not be interpreted as a literal sequential order but rather interpreted that the first status indicator is different than a second status indicator. Thus, the specific details set forth are merely exemplary. The specific details may be varied from and still be contemplated to be within the spirit and scope of the present disclosure. Moreover, the term "coupled" is defined as meaning connected either directly to the component or indirectly to the component through another component.

The present system and method provides a virtual mobile environment. According to one embodiment, one or more physical objects are used in combination to create a virtual experience. Although embodiments of the present disclosure may be described and illustrated herein in terms of jewelry including charms, necklaces, rings, and bracelets, it should be understood that embodiments of this present disclosure are not so limited, but are additionally applicable to any shaped physical object that is easily transportable that achieve independent utility. For example, exemplary physical objects may include toys, such as figurines or dolls, wearable objects, such as glasses or watches. Furthermore, although embodiments of the present disclosure may be described and illustrated herein in terms of near field communication (NFC), it should be understood that embodiments of the present disclosure are also applicable to other wireless communications, such as radio frequency identification (RFID), Bluetooth, and optical recognition. Although embodiments of the present disclosure are described herein with respect to virtual experiences generally, including games and journals, other applications and interfaces may be included without deviating from the scope of the present disclosure. Moreover, the physical objects may be used to alter or control a virtual object, such that a physical object may launch, configure, shut down, or otherwise control one or more aspects of a virtual device, interface, experience, program, application, etc.

Some embodiments described herein provide a virtual experience that is made available, created, unlocked, controlled, altered, configured, present, or enhanced through one or more combinations of physical objects. The virtual experience interface and/or physical objects may be easily transported to initiate the virtual experience from different locations. The physical object may be specifically or uniquely shaped, such that each physical object is associated to one or more attributes of the virtual environment or experience. The physical object may also have a function independent of its relationship to the virtual environment.

In an exemplary embodiment, a display is provided to display one or more games, programs, objects, websites, or any combination thereof (referred herein as "applications"). The display may be a dedicated display or a display of a smart device, such as a phone, a tablet computer, a laptop computer, and a screen (with or without touch input). The display may be configured or shaped based on the type of an application intended to be run. The display is coupled to one or more processors, memory, or other circuits and components to receive, interpret, and display desired images. For example, the display may be associated with hardware, software, or a combination thereof to receive and execute software that provides the display instructions. Also associated with the display may be one or more user interfaces that permit a user to provide an input to the device based on the displayed image. For example, the screen is a touch screen that displays one or more attributes to provide further input to the device and alter or further control the displayed image. Other input/output devices may also be coupled to the display including a keyboard, a mouse, a button, a roller ball, and a joystick. One or more sensors may also be coupled to the device to determine orientation and/or movement to additionally provide input/output to a user. The display may be easily transportable, and the application can be used in a variety of location or during transit between locations.

The system and/or application may include a user interface to allow a user to modify the applications associated with the system. For example, a user interface is displayed to a user to provide the user a configuration screen to select desired configuration parameters. Different configuration parameters include, but are not limited to, user preferences, access controls, and target responses. The information provided by the user may be stored in one or more of a target, a reader, a display, or an external system. For example, the user preferences are stored on a server or a remote computer accessed through the Internet. Other cloud-based solutions may additionally be used to provide remote access to one or more of the instructions associated with the user preferences, target, reader, and/or display.

A physical object is associated with the virtual experience depicted on the display. The physical object may be coupled to the display to identify which application to run or depict on the display. The physical object may include hardware and software to store, send, and receive instructions to the display. The physical object may additionally receive and store instructions or data based on information received through the input/output devices coupled to the display. The physical object, once coupled to the display, make available, create, unlock, control, modify, alter, configure, or enhance one or more applications produced on the display. For example, the physical object stores a program that is received, read, and executed by a processor coupled to the display once the physical object is coupled to the display. The physical object contains execution instructions to create, run, unlock, control, alter, configure, or enhance the application. The display or associated electronics need not store the requisite instructions of each target. Alternatively, one or more physical objects may be coupled to the display to provide the full virtual experience. Therefore, a first physical object may be used to provide a basic application, while one or more additional physical objects are used to modify, enhance, alter, unlock, or otherwise provide features to the basic application. The display itself and its associated electronics may act as one of the physical objects.

In an exemplary embodiment, the one or more physical objects are easily transportable, such that the application may be executed at a convenient location to provide the virtual experience to a user. Moreover, the application may be executed in transit between locations. The physical object may be shaped or configured to further assist in transporting the physical object. The physical object may also be shaped or configured to perform a function independent of association with the virtual experience. For example, the exemplary embodiment described below illustrates one or more physical objects in the form of jewelry. Examples of such jewelry include, but are not limited to, charms, bracelets, necklaces, rings, and earrings. One or more physical objects may be in the form of one or more jewelry pieces, such that the pieces may be associated in various combinations to provide a desired virtual experience. The present disclosure is not limited to the physical object of jewelry, but encompasses any physical object in the spirit of the present disclosure. For example, physical objects include, but are not limited to, figurines, clothing, dolls, stickers, toys, pins, coins, tags, cards, and accessories.

The physical object and the display interact through one or more physical or non-physical connections. As used herein, the term "couple" is interchangeable with the term "attach" and includes both physical and/or non-physical connections including wireless connections. Wireless refers to transferring information, data, signals, power, or the like between two points or objects not connected by a physical conductor, such as an optical connector or an electrical connector. For example, wireless communications include, but are not limited to, light, sound, magnetic, electric, or electromagnetic fields, waves, or particles that are transferred, sent, or propagated between the two points or objects. Wireless communications may further include near field communication (NFC), radio frequency identification (RFID), Bluetooth, and optical recognition. Visible or light wireless communications may include bar codes, quick response (QR) codes, printed objects, or the like. Other optical recognition systems may employ color, shape, image, or other feature recognition. For example, a visual camera is used to identify and distinguish objects based on a visual attribute of the object, such as its color, shape, appearance, and pattern. One or more physical objects may be a primary device that sends and receives information as well as provides power to a secondary device, while the secondary device may simply send information, or send and receive information once powered by the primary device. Alternatively, each physical object may be self-powered. One or more wireless connections may be made with one or more different protocols or mediums such that the physical object is coupled to the display.

FIG. 1 illustrates an exemplary embodiment of a system for using one or more physical objects to interact with a virtual environment, according to one embodiment. A system 100 includes a display 102 that is used to represent a virtual environment to a user. One or more physical objects are used to display, create, unlock, control, modify, alter, configure, or enhance (referred to herein collectively or individually as "interact with") the virtual environment. For example, a first physical object includes a reader 104 and a second physical object includes a target 106. The target 106 includes information, data, instructions, code, etc. associated with the virtual environment. The reader 104 reads or otherwise obtains the information from the target 106, execute that information and communicate with the display 102 such that the information from the target 106 is illustrated on the display 102 through the reader 104. The target 106 may be independently powered or may receive power from either the reader 104 or the display 102. The reader 104 may be independently powered or receive power from the display 102. The target 106, reader 104, and the display 102 may communicate through one or more communication paths, including physical connectors and wireless communication.

In an exemplary embodiment, a tablet computer 108 is used as a display 102. The tablet computer 108 includes hardware and/or software to store code to depict an image to a user. The tablet computer 108 further includes a processor or other hardware for retrieving and executing the software code. The tablet computer 108 includes a wireless communications device for communicating to a physical object, such as the reader 104 and the target 106. In one embodiment, the tablet computer 108 includes a near field communication (NFC) device for sending and receiving information by magnetic induction to or from an antenna within the tablet computer 108 and an antenna within either the reader 104 and/or the target 106. Alternatively or in addition thereto, the tablet computer 108 may include other wireless communications such as Bluetooth. The tablet computer 108 may also or alternatively include one or more physical ports for connecting a physical connector to either the reader 104 or the target 106. The port may include, for example, a universal serial bus (USB), Ethernet, serial, digital visual interface (DVI), or other interface. The tablet computer 108 may include one or more user input/output devices, such as a touch screen, a keyboard, a mouse, a joystick, a button, a toggle, a switch, etc. The input/output devices may be integrated into the tablet computer 108 or coupled to the tablet computer 108 through a physical or wireless connection. A tablet computer 108 is illustrated including a display 102. However, any device such as a smartphone, a touch screen device, a laptop computer, a desktop computer, a television, a monitor, etc. may be used in place of the tablet computer 108.

The reader 104 may be either separate or integrated with the display 102. The reader 104 may be used to obtain the data, information, or code from the target 106, and process the information and provide the display signals to the display 102. The reader 104 may include memory, hardware or software logic devices, processor, or other related circuitry to store, send, and receive information. The reader 104 may additionally execute the retrieved information from the target 106. The reader 104 may fully process the information from the target 106 and provide display signals to the display 102, or forward information to the tablet computer 108 for further processing before being displayed. The reader 104 may be configured to attach or hold one or more targets 106, such that one or more targets may be read by the reader 104 at any given time. The reader 104 may include an antenna for communicating with the target 106 through, for example, NFC. The antenna and associated circuitry may be configured to power the target 106 as well as send and receive information from or to the target 106.

According to one embodiment, the target 106 stores data, information, code, and instructions. The target 106 interacts with the reader 104 such that the reader 104 obtains information from the target to create and/or display the appropriate virtual environment to a user. The addition, subtraction, or combination of one or more targets determines the associated virtual environment presented to the user. Therefore, targets may work singularly or together to provide different virtual environments. For example, a first target may provide a basic application, while an additional target may be used in combination to provide enhanced or altered features to the basic application.

Embodiments as described herein may provide the virtual experience through an interface interacting with one or more physical objects. The physical objects may not need to be physically electrically coupled to a console to engage in the virtual experience. In an exemplary embodiment, the physical object is wirelessly coupled to a display to select the virtual experience, such as through a reader. Wireless communication may include light, sound, magnetic, electric, or electromagnetic fields, waves, or particles to communicate between two points that are not connected by a physical conductor, such as an electrical wire or optical cable. For example, wireless communication include near field communication (NFC), radio frequency identification (RFID), Bluetooth. One or more wireless communication protocols may be used to create a link between a target, a reader, and/or a tablet computer. For example, NFC is used between the one or more targets and the reader, while Bluetooth is used between the reader and the display. The one or more communication links may be unidirectional or bi-directional. Accordingly, the targets may simply provide information or data to the reader, or may also receive and store information from the reader.

The instructions or code to run an application may be stored in the target 106, the reader 104, the tablet computer 108, an external system, or a combination thereof. For example, code for executing an application, such as a program, is stored on a target 106. The target 106 may include the entire program code to execute one or more applications, or one or more portions of an application. The target 106 includes a processor for executing the application and provides display instructions to either the reader 104 or the tablet computer 108. Alternatively, the target 106 provides the memory space to store all or a portion of an application, data, instructions, algorithm, or a routine and sends that information to the reader 104 to execute within a processor of either the reader 104 and/or the tablet computer 108. The reader 104 and/or the tablet computer 108 may execute and display the associated target information or may incorporate the information into another application retrieved from another target 106 and/or the reader 104 or the tablet computer 108 for creating an altered application for display to a user.

According to one embodiment, the target 106 includes instructions, code, inputs, identifiers, or the like for making another application, function, routine, or sub-routine available, or creating, unlocking, controlling, modifying, altering, configuring, enhancing, initiating, or otherwise interacting with one or more applications stored on the target 106, the reader 104, or the tablet computer 108. Therefore, the application code may be stored on either the reader 104, the tablet computer 108, or an external system, and the data, code, or instructions from the target 106 provides an input to the application to execute in a desired fashion. For example, a program is stored in the reader 104, and the target 106 possess an identification that is received by the software and verified by the program to permit either the reader 104 or the tablet computer 108 to execute and/or display that application or program within an application to a user.

According to another embodiment, the software and/or execution of an application associated with a given target may be stored on an external device, such as a server that is accessed wirelessly or wired through the target 106, the reader 104, and/or the tablet computer 108. The server may be hosted on the Internet and the target 106, the reader 104, and/or the tablet computer 108 include an instruction and/or host identifier to navigate the Internet and retrieve the respective information associated with the target identifier or retrieved data. The target 106 provides one or more identifiers for the externally hosted data site and/or identifier for the respective target. The reader 104 receives that target information and navigates the Internet (i.e., the cloud) to a host site identified by the target 106 and/or pre-programmed into the reader 104. The reader 104 retrieves instructions associated with the target identifier from the host site. The host site may be used to execute the associated application or may simply provide the associated application to the reader 104, for example, by downloading the application either temporarily or permanently to the reader 104 for execution.

In an exemplary embodiment, one or more of the targets are self-verifying. For example, the associated response is determined directly from the information sent from the target 106. Accordingly, the reader 104 responds to the target information in a single and known way. In an exemplary embodiment, the target 106 is used to unlock a certain feature within a given application (such as providing a certain font to characters). The target 106 performs the associated function regardless of the given application chosen. If the function is inapplicable to a given application (for example, the program does not use ASCII characters), then the target 106 does not alter the associated application. The target 106 provides the instruction and/or data necessary to execute the associated function and/or application.

In an exemplary embodiment, one or more of the targets are system-verified. For example, the associated response is determined and/or interpreted by the reader 104 and/or associated application. Accordingly, the target 106 is associated with a given function depending on the interpretation of the reader 104 or presently executing program. The target 106 provides an identifier, key, or indicator that permits the reader 104 to respond in any desired or programmed fashion. Accordingly, the reader 104 provides a different response to the target 106 depending on the given application. In an exemplary embodiment, the reader 104 includes a relational database that permits the identifier associated with a given target 106 to be read and interpreted with a desired function and/or application. The database is updated or modified by a user and/or host. For example, the target 106 is identified as a program to link the first user with the target 106 to another user. The other user may be associated with the physical target 106 by the first user through an input into a program interface that updates and identifies the target 106 to the specific other user. The user also identifies one or more other functions of a given target 106 that is stored in the database and accessed by the reader 104 to determine the associated response within the virtual environment. A device programmer also uses the database to upgrade or update software and the associated features of the target 106 as additional applications and/or functions are created for a user. Alternatively, each primary application responds to the target identifier in a given and programmed fashion. Accordingly, the response of any one or more target 106 is pre-programmed into the selected primary application stored within the system, i.e., the target 106, the reader 104, and/or the tablet computer 108.

In an exemplary embodiment, one or more of the targets are externally-verified. For example, the associated response is determined based on a relationship external to the target 106, the reader 104, and/or the tablet computer 108. In an exemplary embodiment, the associated function and/or application of a target 106 is stored in a relational database. The database is maintained in an external environment, such as a remote server, or "the cloud." The target 106, the reader 104, and/or the tablet computer 108 are configured to access the database upon detecting one or more targets to determine the associated application and/or function of the target 106. The target 106 provides an identifier or other key or indicator that permits the reader 104 to respond in any desired or programmed fashion. Accordingly, the reader 104 provides a different response to the target 106 depending on the information retrieved from an external source. The external source is configurable by a specific user or is generic to all device users. Accordingly, the system is configured to access a given external source by individual user. The system is programmable such that, for example, registration of the reader 104, one or more targets 106, and/or the tablet computer 108 creates an external source for the respective user. The user has access to the database to configure one or more attributes of a given target 106. The external source is updated or modified such that the associated function and/or application of the given target 106 are altered in real-time. Alternatively, the system is configured to access the same one or more external sources regardless of the individual user. The one or more external sources are also updated and/or modified by a manufacturer or programmer regardless of whether individualized or not.

In an exemplary embodiment, the target 106 is used as an access device into the application or virtual environment. Once the target 106 is detected by the reader 104, access is granted to all or part of the application associated with that target 106. Therefore, the reader 104 provides a single sweep or continuously and/or periodically sweeps to determine the presence of a target. Once access is granted, the system permits access regardless of the continued presence of the target 106 coupled to the reader 104. The application, the reader 104, and/or the tablet computer 108 include a log-out or exit feature that permits the application to shut down, lock, or stand by, etc. Access is then be reinitiated by confirming presence of the associated target 106. Accordingly, the target 106 is used as an access identifier to permit entry into one portion, or more portions of an application.

The reader 104 periodically or continuously determines the presence of a target 106 to permit continued access to an application or portion thereof. Accordingly, the reader 104 sweeps for the presence of one or more targets 106 at a determined interval, for example, every second, every few seconds, or every sub-second. The system provides access to all or a portion of an application associated with the target 106 as long as the target 106 is detected. Accordingly, a user may quickly close, lock, snooze, or shut-down an application or a portion thereof by simply removing, disconnecting, and/or disassociating the reader 104, the tablet computer 108, or the target 106 from the one or more other components.

According to one embodiment, the system is configured to respond to the absence of a target in a desired fashion. For example, continued access is granted as a log-in mechanism, or may snooze an application, prevents viewing of an application while maintaining the application, saving and closing an application, closing an application, continues the application while removing the feature(s) associated with the target, locking the device and/or application. The system is configured to treat certain classes of targets differently. For example, if a target provides access to a primary program, the target is configured as a log-in type device, while if the target is providing an enhancement to a program, that enhancement is available only as long as the target is present. The target 106 and/or the reader 104 are configured with an input, such as a button, switch, and detector, such that the target provides configurable access to the associated application. The reader 104 is configured with one or more inputs (physical and/or virtual) to set the response of the continued detection of a target 106 and/or sweep rate of the reader 104 to detect one or more targets 106 upon indication of a user. The system is also configured by the user through a program application interface, or physical control, such that the sweep is continuous, periodic, on demand, or upon start-up, and the target response is log-in or continued verification. The sweep rate is set independent of the systems response to the continued presence of the target 106, or may be associated therewith. For example, if using a single sweep mode, the targets 106 is configured to act as log-in devices permitting access to an associated virtual environment, while if used in a continuous mode, the target 106 is continuously or periodically detected to determine continued access to the device.

According to one embodiment, the target 106 is an active device that provides its own power source. According to another embodiment, the target 106 is a passive device such that it receives power through one or more other devices, such as the reader 104 or the tablet computer 108. The target 106 includes memory, hardware or software logic devices, a processor, or other related circuitry to store, send, and receive information. In an exemplary embodiment, the target 106 includes an antenna to receive power and/or to communicate with either the reader 104 or the tablet computer 108 through NFC.

The reader 104, the target 106 and the tablet computer 108 communicate through a physical connector or a wireless connection. For example, the reader 104 and target 106 communicate through NFC or other wireless communication, while the reader 104 communicates through a physical connection, such as through a USB port or wireless connection, such as Bluetooth. The reader 104 may include a connector, such as a wire and a plug that mates with a port on the tablet computer 108. Components making up the application, interface between the target 106, reader 104, and display 102 are implemented in electronic circuits, software coding, or any combination thereof, and where components implemented in software coding are stored in an executable format on a non-transitory machine-readable medium.

In an exemplary embodiment, each of the target 106, the reader, 104, and the tablet computer 108 are shaped or configured for easy transportation. The reader 104 and the target 106 are shaped for additional functionality separate from the application. In one embodiment, the reader 104 and the target 106 are shaped as jewelry. Such a configuration permits a convenient means to transport the device while permitting easy use. In an exemplary embodiment, one jewelry piece may be used as the reader 104, while another jewelry piece may be used as a target 106. When the target 106 is brought into close proximity to the reader 104, the reader 104 powers the target 106 and retrieves the saved information. The reader 104 executes or processes the retrieved information and then communicates with the tablet computer 108 to display a virtual environment. The jewelry piece of the reader 104 may be configured to hold or retain the jewelry pieces of the target 106 in appropriate proximity. One or more other jewelry pieces may be used to hold additional or alternative target jewelry pieces that are not currently in use. The holding jewelry piece may be positioned on the body away from reader jewelry piece such that the targets may be made available when desired, but not read until desired.

Figure 2:
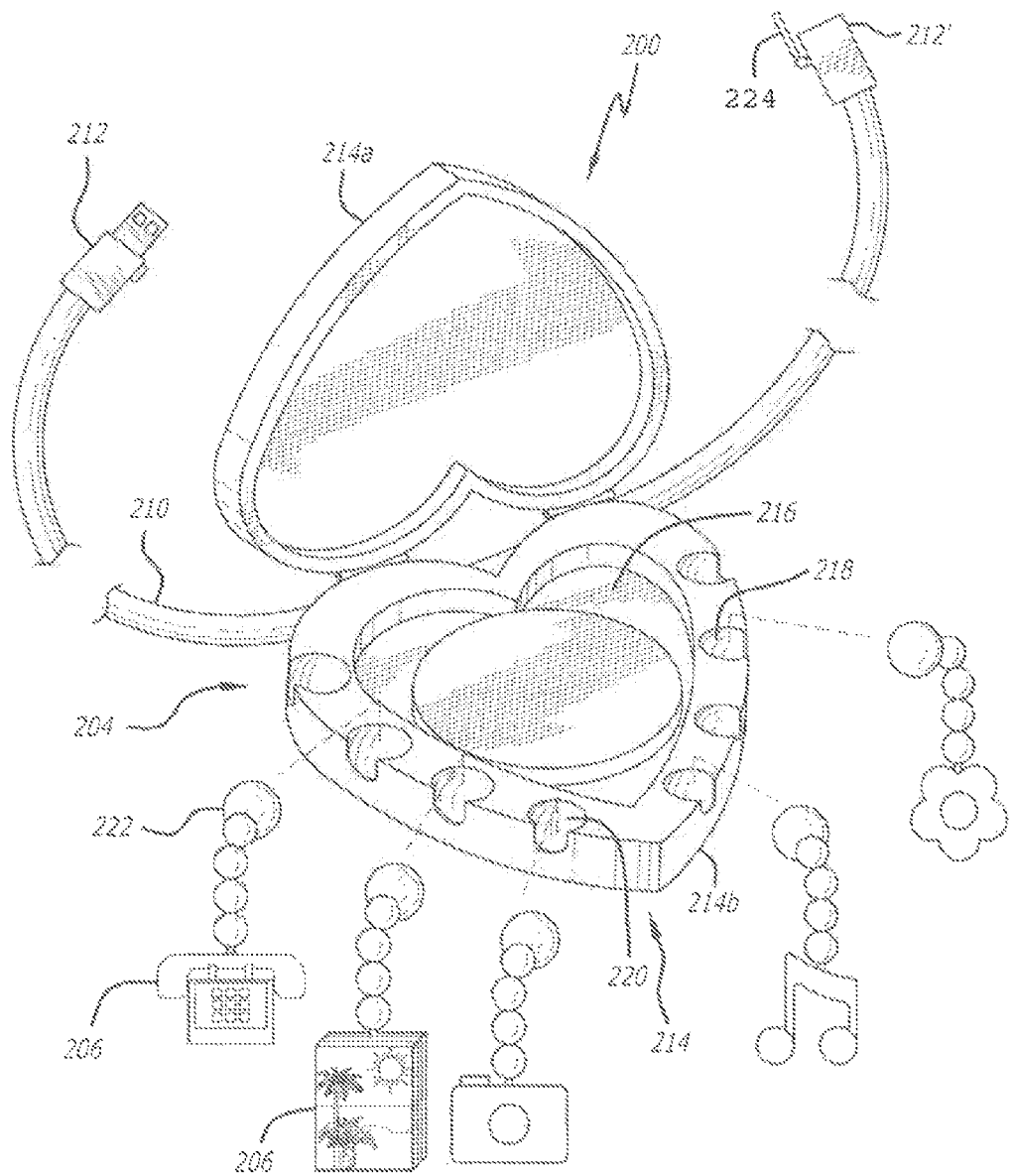
FIG. 2 illustrates an exemplary embodiment of a reader, according to one embodiment.

FIG. 2 illustrates an exemplary embodiment of a reader, according to one embodiment. A reader 204 is in a form easily transportable, while performing more than one function. The reader 204 performs a first function of adorning a wearer.

In an exemplary embodiment, the reader 204 is a pendant or a charm on a necklace 200 that is coupled to a chain, a cord, or a cable 210. The reader 204 includes a housing 214. The housing 204 is shaped as a necklace locket. For example, the housing 214 includes a front face 214a hinged or otherwise coupled to a back face 214b. The front face 214a and back face 214b open to expose an interior cavity 216. The interior cavity 216 is sufficiently sized to accommodate one or more targets 206. The interior cavity 216 is accessible in an open configuration and inaccessible in a closed configuration. The front face 214a transitions between a closed configuration and an open configuration by rotating, separating, disengaging, uncoupling, or otherwise reorienting the front face 214a with respect to the back face 214b. The front face 214a may be coupled to the back face 214b by one or more hinges, joints, snaps, intentions, protrusions, clasps, hooks, frictional interfaces, snaps, buttons, levers, or any combination thereof.

In an exemplary embodiment, one or more exterior cavities 218 are included along an exterior perimeter of the housing 214. The exterior cavity 218 is shaped to accommodate a portion of the target 222. The opening 220 of the exterior cavity 218 is shaped as at least a portion of a spherical space, and the complementary structure 222 of the target 206 is similarly spherical. The opening 220 permits a portion of the target 206 to extend from the exterior cavity 218 through the opening 220. The opening 220 is configured to mate with a portion of the target 206, such that the target is removable from the housing 214 when the front face 214a is in an open configuration and retained when the front face 214a is in a closed configuration with respect to the back face 214b.

In an exemplary embodiment, the reader 204 includes one or more wireless communication devices. The reader 204 may include one or more antennas for communicating, for example through radio frequencies including one or more protocols (e.g., Bluetooth, NFC, and RFID). The reader 204 may include one or more wireless communication components for communicating with a target 206 and/or a display. For example, the reader 204 communicates with the display through Bluetooth, while communicating with the target through NFC. The reader 204 includes a power supply, processor, memory, and supporting electronics to implement the desired wireless communication.

The reader 204 interacts with a target 206 when it is brought into close proximity to the target 206. The reader 204 may supply power to the target 206 and then interact with the target 206 through reading and/or writing instructions or otherwise sending information and data from/to the reader 204. The reader 204 may interact with the target 206 through either a wireless connection or physical wired connection. For example, the reader 204 includes an antenna within the front face 214a and/or back face 214b to power and communicate with the target 206 through NFC. The target 206 may also electrically connect with the reader 204 through the connection at the external cavity 218. For example, the external cavity 218 is a port such that insertion of the target 206 creates an electrical connection to the reader 204 as well as retaining the target 206 to the reader 204. The range of the reader 204 is such that when the target 206 is fully or partially enclosed by the housing 214, the reader 204 powers and interacts with the coupled target 206. The reader 204 may also be configured that power is not supplied to the target 206 unless the reader 204 is in a closed configuration. The reader 204 may also include one or more switches, buttons, or controls to turn the reader on and off, such that the reader 204 does not unintentionally read a target 206.

In an exemplary embodiment, the reader 204 includes a connector to electrically, physically, and directly connect the reader 204 to a display. The cord 210 is physically connected to reader 204 through the housing 214, and terminates at one end at a USB connector 212. The connector 212 forms part of a clasp or attachment to the opposing side of the cord 210 supporting the reader 204. Therefore, the connector 212' includes a mating interface to connector 212, although the connector 212' may not be electrically connected to reader 204. The connector 212' may also include one or more locking mechanisms 224 to secure the connectors 212 and 212' to each other beyond the interference fit created by the insertion of one connector into the other. The locking mechanism 224 may be hinged, jointed, rotatable or otherwise configured to fit around, through or otherwise a portion of the connector 212. Other locking mechanisms 224 may include a mated mechanism on connector 212. For example, an indent, a detent, a clasp, a hook, a loop, a snap, a projection, or an indention may be included on connectors 212 and/or 212' to increase the resistance between the connectors to disengage. The reader 204 may include one or more compartments within the housing 214 to incorporate a cord and connector to couple the reader 204 to a display. The reader 204 may also include one or more ports to accommodate a removable connector between the reader 204 and a display.

Figure 3:
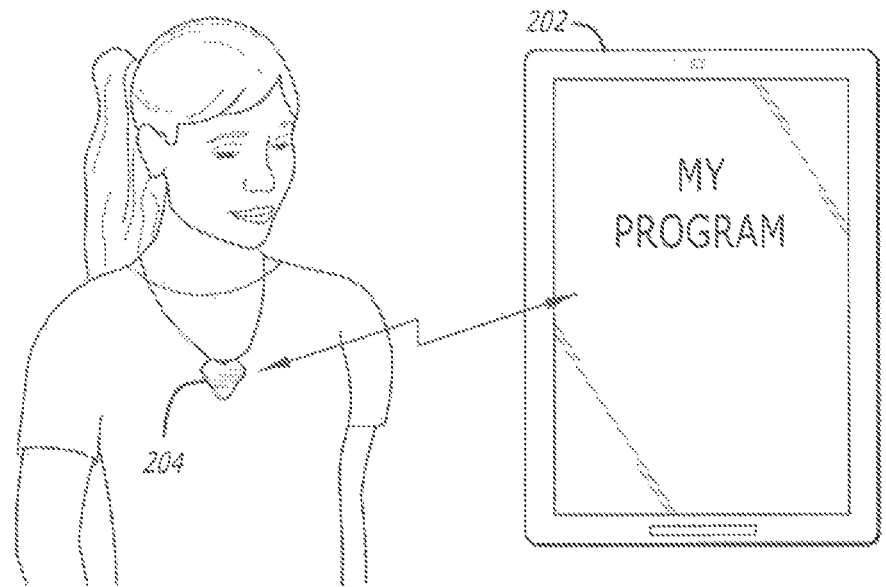
FIG. 3 illustrates an exemplary configuration of the present system, according to one embodiment.

As shown in FIGS. 3-10 illustrates exemplary configurations of a system including different combinations of targets 204 create different effects on a display 202. FIG. 3 illustrates an exemplary configuration of the present system, according to one embodiment. The reader 204 is configured to connect to a display 202. When the connection is made, the display 202 recognizes the reader 204 and opens a specific application. The application may be opened automatically when the reader 204 is physically coupled to the display 202 and or when the reader 204 is brought into sufficiently close proximity to the display 202, for example, when a wireless connection is made. Alternatively, the application may be made available to be launched by the user by manipulating the display 202 and/or one or more inputs coupled to the display 202 when the reader 204 is coupled to the display 202. The reader 204 and/or display 202 may also be configurable, such that the launch of the application is set as desired.

Figure 4:
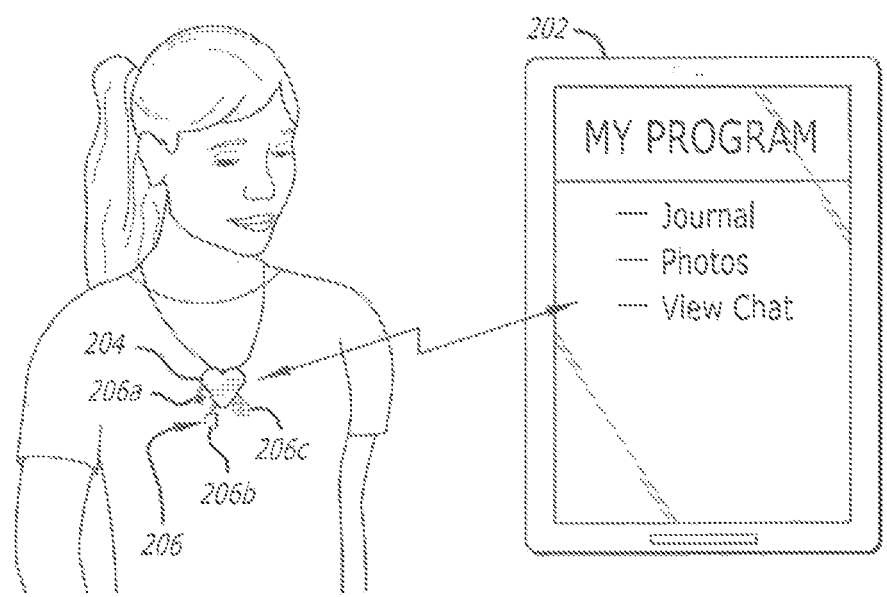
FIG. 4 illustrates another exemplary configuration of the present system, according to one embodiment.

FIG. 4 illustrates another exemplary configuration of the present system, according to one embodiment. When a reader 204 is brought into proximity with a display 202, a primary application is launched including a user interface. When one or more targets 206 are coupled to the reader 204, the application includes one or more additional features and/or programs. As shown, each target 206 is associated with an additional feature or program. The target 206 may be shaped to suggest the associated feature or program. For example, a first target 206a is shaped as a telephone and unlocks or makes available a program to chat with another user A second target 206b is shaped as a book and unlocks or makes available a program to keep a journal, and a third target 206c is shaped as a camera and unlocks or makes available a photo gallery program on the display 202. The user may then directly interact with the display 202 through one or more controls, such as a touch screen, buttons, keyboard, mouse, stylus, etc. to choose and manipulate the individual programs. The reader 204 is used to launch a primary application including a user interface. The presence or absence of one or more targets 206 determines which programs are available through the user interface. The presence or absence of an individual target 206 alters, unlocks, modifies, etc. the primary application created by the presence of the reader 204.

Figure 5A:
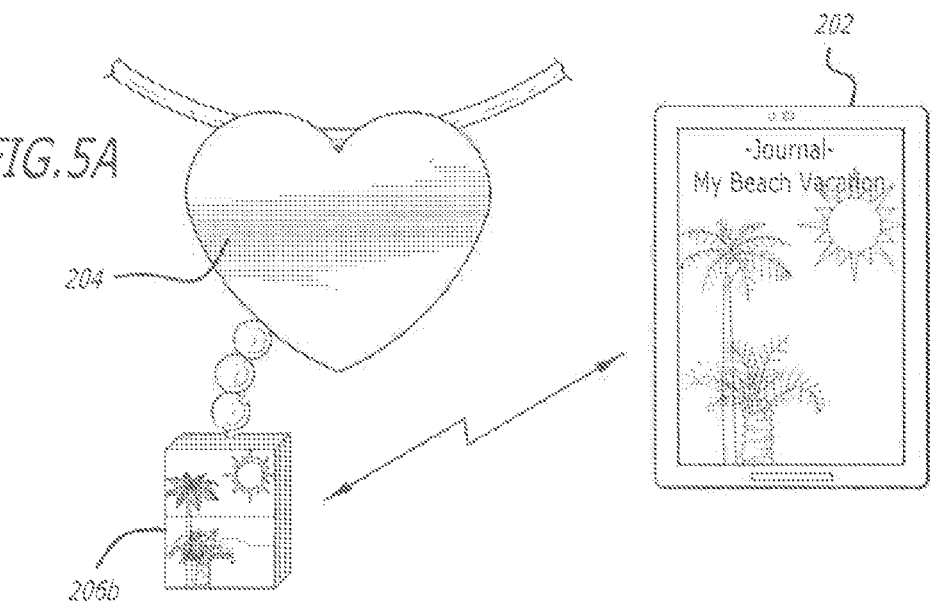
FIGS. 5A and 5B illustrate an exemplary process for launching a program from an individual target, according to some embodiments.
Figure 5B:
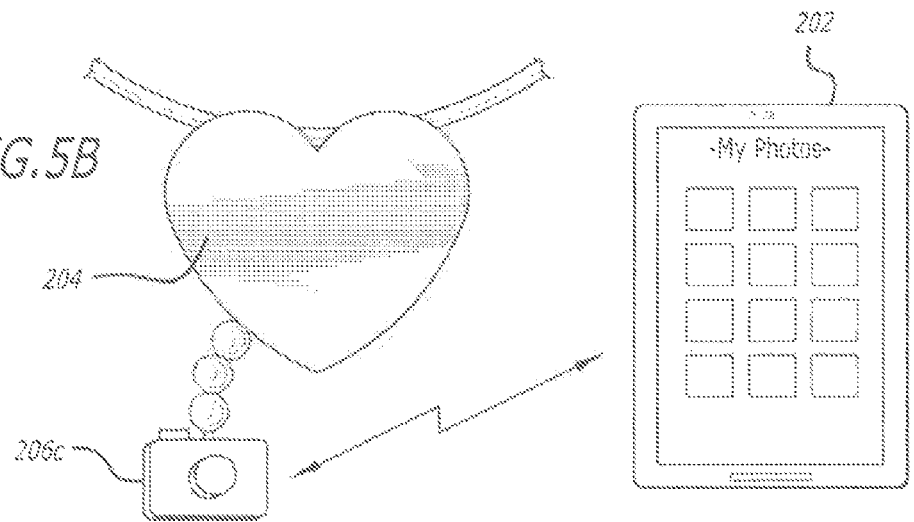

FIGS. 5A and 5B illustrate an exemplary process for launching a program from an individual target, according to some embodiments. Instead of making multiple programs available, the presence of a given target 206 automatically initiates an associated program. For example, when the target 206b, shaped as a book, is coupled to the reader 204, the journal application is automatically launched. The target 206b is removed from the reader 204 to close the application, and another target 206c is inserted to initiate a second application, My Photos.

Figure 6:
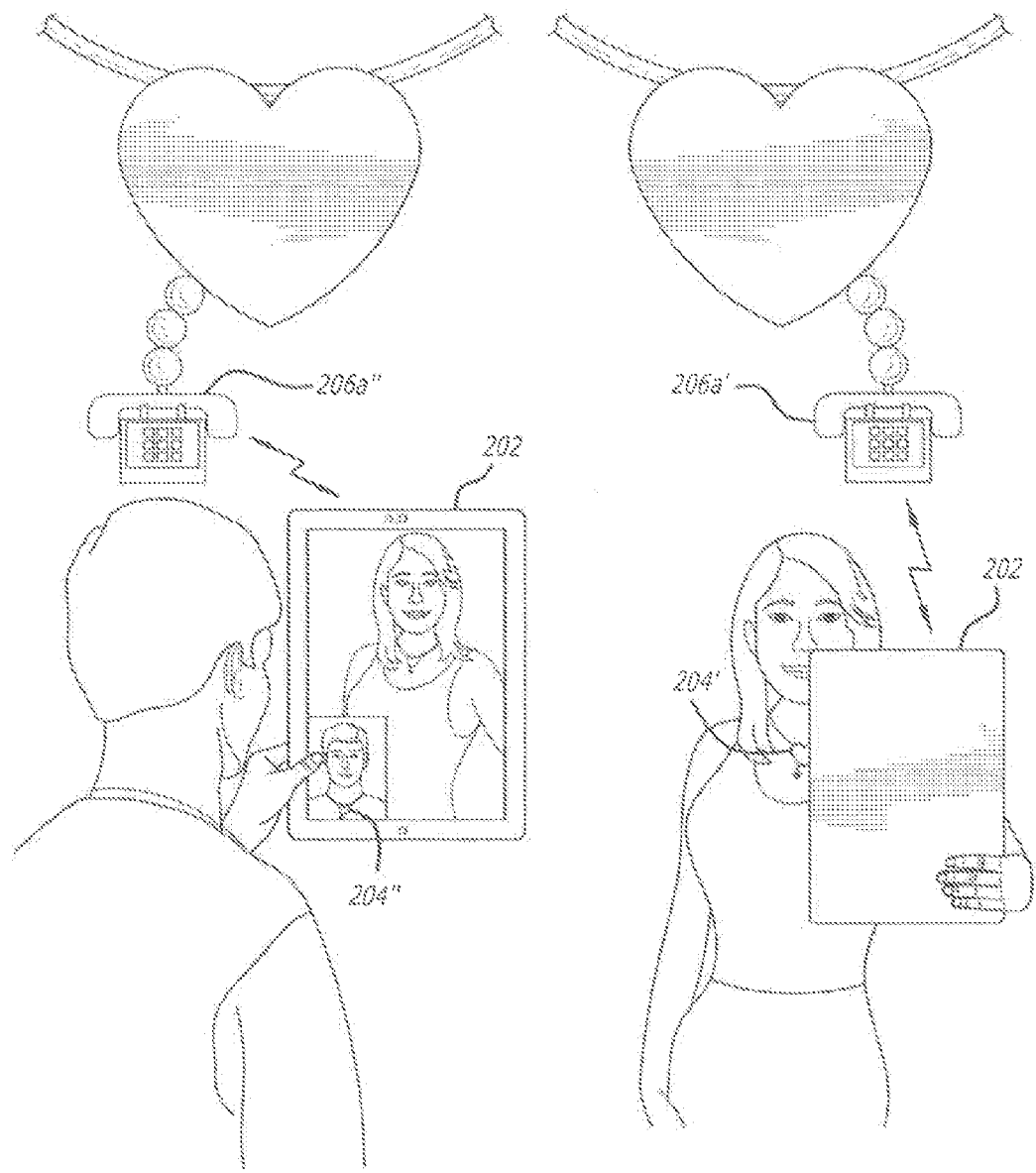
FIG. 6 illustrates an exemplary process for coupling targets from different users to applications from one or more reader, according to one embodiment.

FIG. 6 illustrates an exemplary process for coupling targets from different users to applications from one or more reader, according to one embodiment. A first user includes a first reader 204' and a second user includes a second reader 204". Each user has a target 206a' and 206a" indicative of an application to be run on a respective display. The target 206a may be used to provide access and/or launch the application. The targets 206a' and 206a" may also be linked such that the application identifies the presence of a specific target and creates a connection to the device linked to a corresponding specific target. In this example, the first user has a first reader 204' that links to target 206a' to launch a communications application, such as a video chat, on a first display. The second user has a second reader 204" that links to a second target 206a" to launch a communications application, such as a video chat, on a second display. The users connect through manipulating the application interface. Alternatively, the presence of the targets 206a' and 206a" determines and creates the connection through the communication applications, and the first user may automatically connect to the second user.

Figure 7:
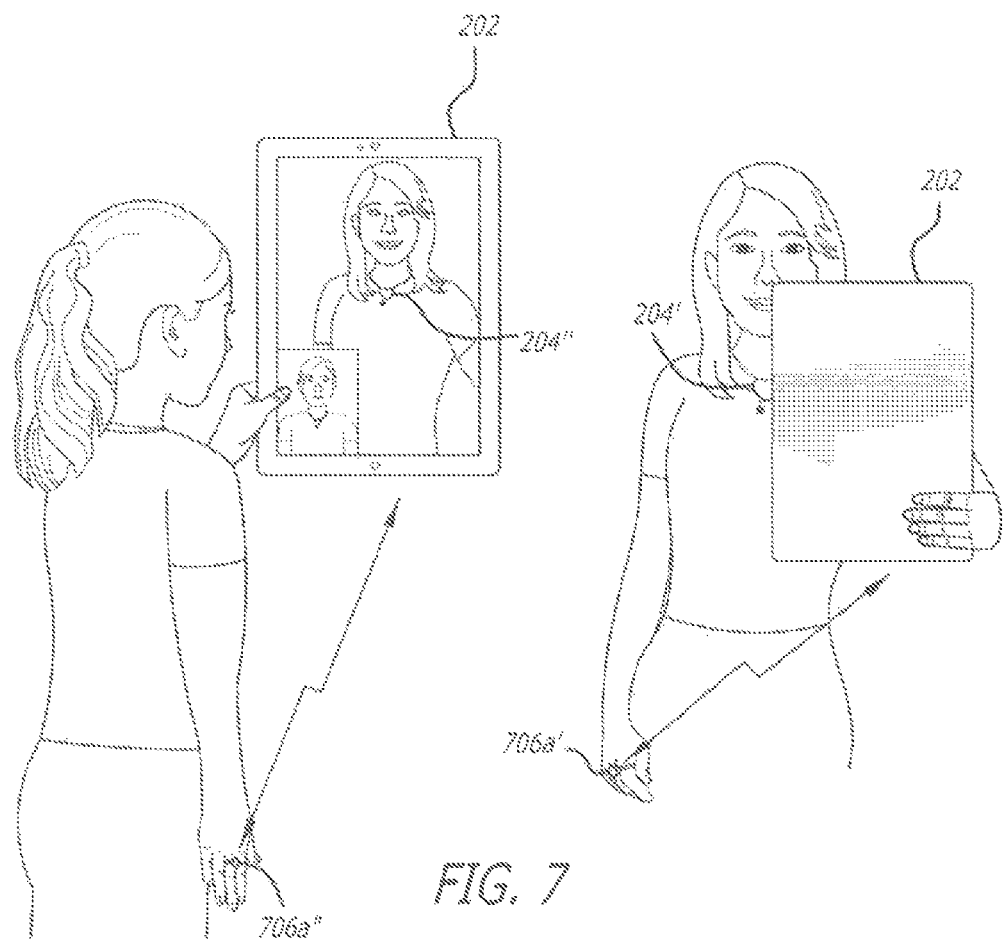
FIG. 7 illustrates an exemplary process for detecting a presence of additional targets and creating a communication connection, according to one embodiment.

FIG. 7 illustrates an exemplary process for detecting a presence of additional targets and creating a communication connection, according to one embodiment. The first and second users respectively have the first reader 204' and the second reader 204" and the first target 206' and the second target 206a" as described above with respect to FIG. 6. The first and second targets 206' and 206" are used to launch the communications application. A separate third and fourth target 706a' and 706a" may then also be linked to the readers 204' and 204", respectively, to provide the identification component such that users may connect to others with a mated target. The targets for launching an application are provided on a charm that is coupled to the reader, while the identification target is provided on as a ring. In an exemplary embodiment, more than one target is used to fully run and use a single application. Any combination of targets may be used, and the reader 204 and/or the display 202 read the targets to access and manipulate the desired program. For example, the targets 706a' and 706a' are used directly with the readers 204' and 204" without the primary targets, or used directly with the display with or without the primary target, but bypassing the reader 204.

Embodiments as described herein may permit one or more physical objects to create a full virtual experience. Additional physical objects may be introduced to change, enhance, expand, or manipulate the virtual experience. The different interaction of one or more physical objects may create one or more different virtual experiences.

Figure 8:
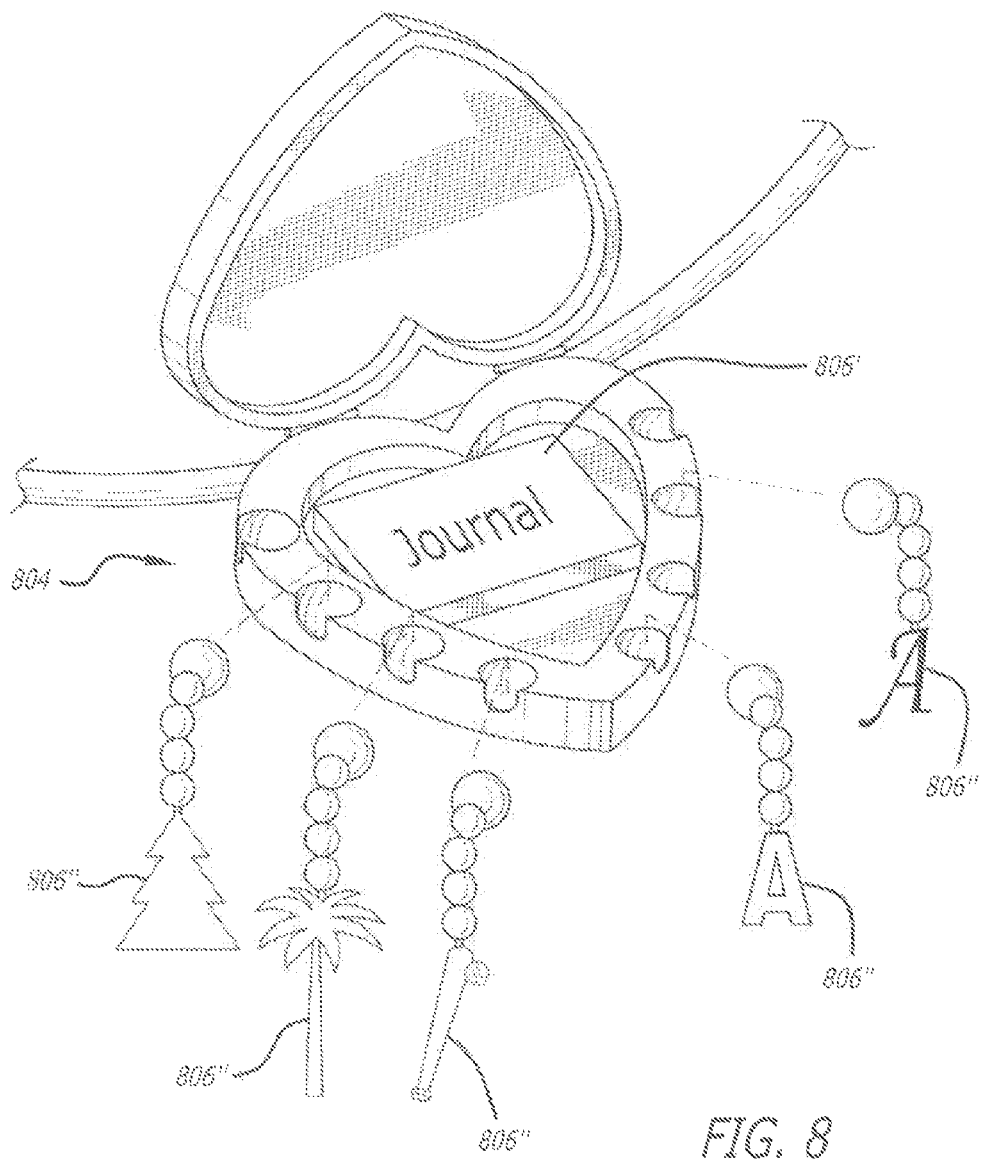
FIG. 8 illustrates multiple targets interacting with a single reader to create different virtual experience, according to one embodiment.

FIG. 8 illustrates multiple targets interacting with a single reader to create different virtual experience, according to one embodiment. A primary target 806' is used to initiate or provide access to an application, while one or more secondary targets 806" are used to modify, expand, enhance, change, or manipulate the virtual experience. FIG. 9 illustrates the interactions of targets, a reader, and a display to create the virtual experience, according to one embodiment.

The primary target 806' is selected and inserted into a cavity of the reader 804. The reader 804 launches an application. The primary target 806' is shaped to indicate or suggest the associated application. For example, a book represents a journal application. When the primary target 806' shaped as a book is brought near or inserted into the reader 804, the application is displayed for manipulation by a user. One or more secondary targets 806" may then also be brought into proximity of the reader 804 to alter the application. For example, for the journal application, one or more secondary targets 806" may be used to provide themes, stickers, font options, colors, backgrounds, etc. The secondary targets 806" may be shaped to suggest their association to the feature or modification made available through the use of that secondary targets. For example, a Christmas tree may indicate a Christmas theme, such that the background may be Christmas colored, and snow flakes, trees, presents, etc. may be available as icons to insert into the journal text. In another example, a palm tree indicate a beach or vacation theme with sun, sand, balls, bright colors as the available options, while a sports theme may be unlocked with the use of a sports shaped secondary target. Different fonts may be available through one or more secondary targets 806". The secondary targets may be used together such that each secondary target 806" permits access to additional features in conjunction, or may be used separately to provide different virtual experiences.

FIGS. 10A and 10B illustrate different virtual experiences through the different combination of primary and secondary targets, according to some embodiments. The targets 806" are used to directly launch and configure a given application based on a set of features associated with the one or more targets. The targets 806" may provide a variety of options to a user that are selected through one or more input devices associated with the display 202.

Exemplary embodiments are generally described above with readers and targets in the form of wearable jewelry. The reader and/or targets can take on any form, and particularly those convenient for transport and/or performing additional functions separate from creating the virtual environment. For example, the reader and/or targets may be any combination of personal or property adornment (e.g., watches, bracelets, charms, rings, earrings, pendants, necklace, pins, tags, hair accessories, and keychain). One class of adornment (e.g., pendants or necklace) may be used as a reader, while another one or more classes (e.g., charms and rings) may be used as the one or more targets. A separate class of adornment (e.g., bracelet, anklet) may be used to store the targets when not in use with the reader. The class of adornment acting as a reader should be worn sufficiently far away from the class of adornment used to store targets, such that the proximity of the target from the reader prevents the reader from detecting, activating, linking, or otherwise connecting to the reader to affect the virtual experience.

Other combinations of physical objects and virtual environments are also contemplated and encompassed by the present disclosure. For example, a stuffed animal may act as a reader, with adornments to the animal, such as clothes, jewelry, etc. as the one or more targets. A display may be incorporated into the stuffed animal or may interact separately from the stuffed animal. Other physical objects may include, for example, but are not limited to, purses and backpacks, figurines, dolls, tags, cards, coins, and tokens.

In an exemplary embodiment, the display is removed such that the targets interact with the reader directly to produce a result. For example, one or more targets are used to play one or more songs when detected and connected by a reader. In this case, a display may or may not be used to display images associated with the lyrics or tune.

Figure 11A:
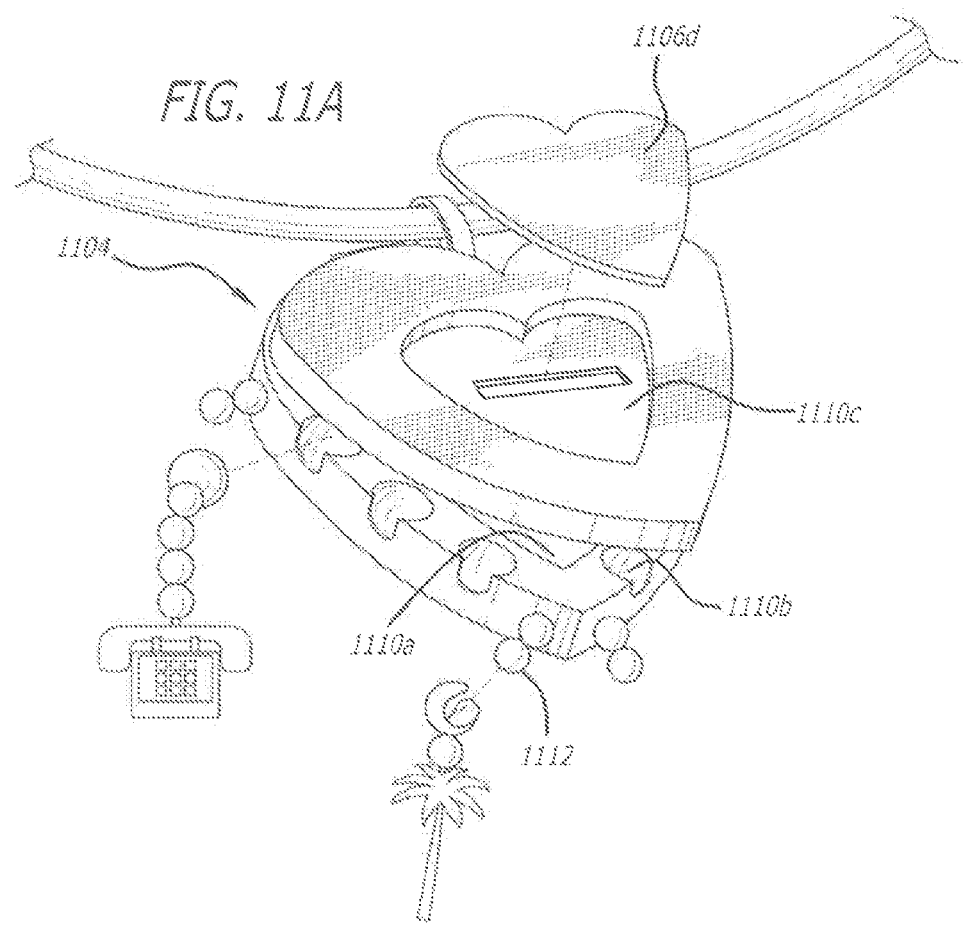
FIG. 11A illustrates an exemplary reader for accommodating multiple physical objects, according to some embodiment.

FIG. 11A illustrates an exemplary reader for accommodating multiple physical objects, according to some embodiment. Physical objects are connected to a reader 1104 to set a desired proximity between the physical objects to couple the devices for creating a virtual experience. As used herein, "close proximity" is understood to be a sufficient distance such that the communication link created between the physical objects is made and maintained at that distance. The close proximity may be dictated by the communication protocol used between the given physical objects. The reader 1104 is shaped as a pendant for a necklace. The reader 1104 may include one or more compartments 1110a-1110c for accommodating one or more targets 1106 at a desired proximity to the reader 1104. The one or more compartments 1110a-1110c may be shaped to fully enclose a target 1106, such as inner compartment 1110a, partially enclose a target 1106, such as peripheral compartments 1110b, or physically attach to the target 1106, such as exterior compartment 1110c. Inner compartment 1110a and peripheral compartment 1110b are accessible by opening the reader 1104 like a locket. The one or more targets 1106 may be inserted into the compartment and retained relative to the reader when the reader is in a closed configuration. The exterior compartment may attach to a target through snaps, friction fit, hook and loop fastener, indent/detent coupling, slot and projection, or other physical connection mechanism. One or more projections, such as beads 1112, strings, cords, extensions, and a hook, may also be used to couple one or more targets 1106 to the reader 1104.

Figure 11B:
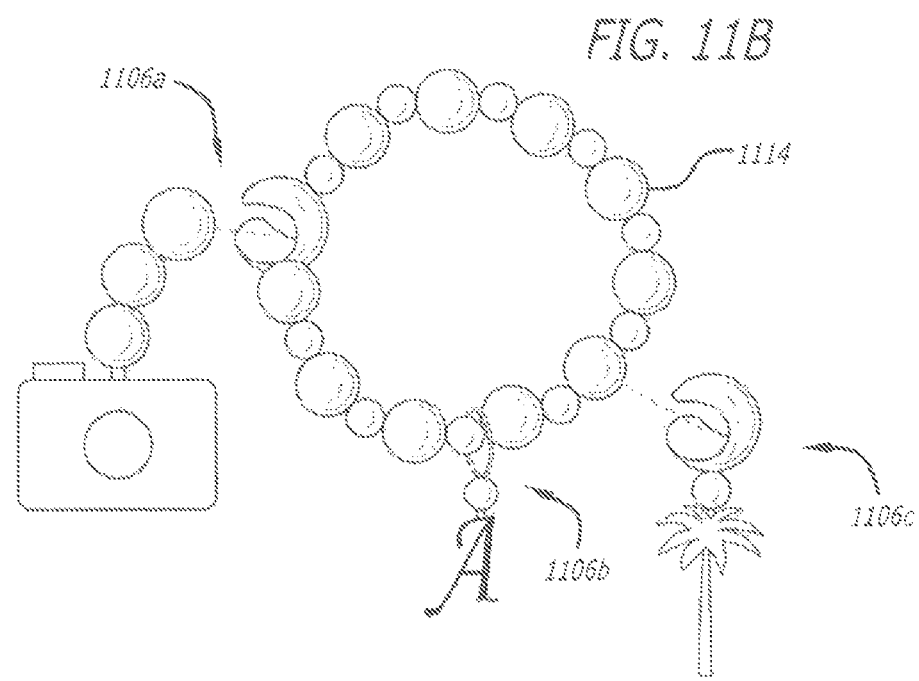
FIG. 11B illustrates an exemplary physical object for retaining a target, according to one embodiment.

FIG. 11B illustrates an exemplary physical object for retaining a target, according to one embodiment. A bracelet 1114 retains a target 1106 when it is not in use with a reader. The bracelet 1114 may be formed to retain the targets using the same shaped features that retain the target to the reader, or a separate connection. For example, a bracelet formed of generally spherical beads is used that match the beaded projections from the reader. The target 1106 may include a mated shaped portion forming a partial spherical covering that frictionally engages the bead of either the bracelet or pendant. The bead and cover may be switched such that the cover portion is on the bracelet and the bead is on the target 1106. The bead or cover may be shaped to engage the reader, for example, by fitting within the one or more cavities of the reader or coupling to the one or more projections or shaped surfaces of the reader.

Figure 11C:
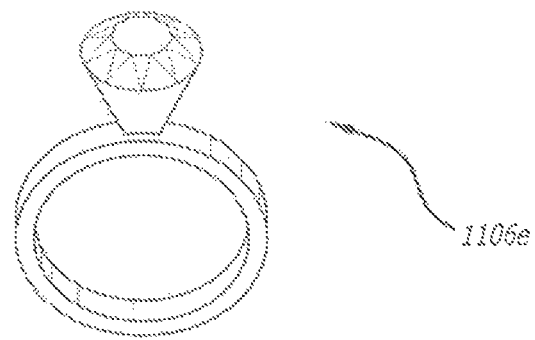
FIG. 11C illustrates exemplary ring target, according to one embodiment.
Figure 11D:
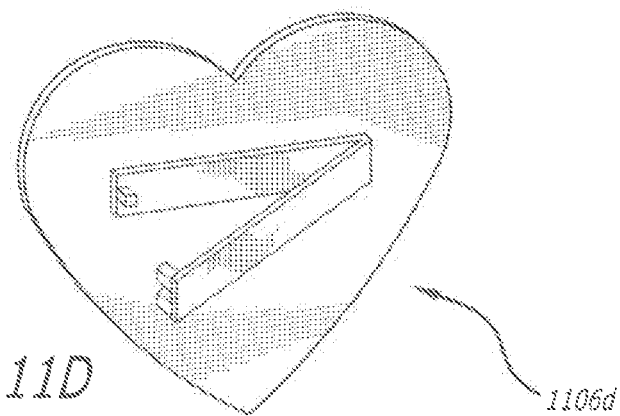
FIG. 11D illustrates an exemplary barrette target, according to one embodiment.

FIG. 11C illustrates exemplary ring target, according to one embodiment. FIG. 11D illustrates an exemplary barrette target, according to one embodiment. A ring target 1106e is shaped to fit within inner compartment 1110a, while the exterior compartment 1110c may be configured to retain the barrette 1106d by mating with the clasp portion of the barrette through one or more engaging surfaces.

One or more classes or categories of physical objects may be used to segregate the one or more targets. For example, a primary target may be used to create and/or launch a virtual experience on a display. The primary target 1106a may have a unique size, shape, color, pattern, image, physical object association (i.e., rings versus charms) different than the other targets. A secondary target 1106b may be used to alter, modify, enhance, unlock, or otherwise affect the application initiated by the primary target. One or more secondary targets may be used in conjunction to create varying virtual experiences. A third set of targets may be used to individually enhance the virtual experience. For example, personal targets 1106c may be mated with a corresponding personal target of another user to identify one or more users and create private connections between users, thus joining virtual experiences. This set of target may also or alternatively be used to initiate one or more preferences indicative of an individual user. Therefore, the personal target 1106c may be used to save and set personal preferences for a virtual experience. Another class of targets may be used in conjunction with the reader, independent of the display. For example, a specialty target 1106d may be coupled to the reader to play sounds, songs, project lights, or otherwise respond to the reader without the display.

Each class of targets may be configured as a distinct group of physical objects and/or may be shaped, colored, imaged, sized or otherwise indicate the distinction from the other class of targets. For example, the primary class of targets 1106a may be larger than the secondary class of targets 1106b. The images or shapes of the primary and secondary targets may also suggest the associated virtual experience attribute or feature, such that the class may also be determined. Targets may also be distinguished through different classes of physical objects, such as different barrettes and hair accessories may be used as specialty targets 1106d, while rings or watches may be used as personal targets 1106c. The different classes of target may be configured to mate with the reader in only a select number of compartments, indicating its primacy.

Embodiments as described herein may use one or more physical objects to create, control, or effect a virtual environment. As such, the system may need to detect, read, and process signals received from multiple sources, while keeping those signals distinguishable. Different handling systems and/or algorithms may be employed to receive, detect, and process the associated signals. In one embodiment, the different objects may employ different protocols (i.e., electrical physical association, NFC, Bluetooth, etc.) to distinguish the objects. Alternatively, within the same general protocol, different operating frequencies, sending/responding times, coding, etc. may be used to distinguish the different signals received from respective objects. The system may employ sequential reading techniques that are sufficiently fast that the system appears to read the objects simultaneously to provide a resulting application and/or virtual environment within a reasonable amount of time that incorporates the attributes of all of the desired objects coupled to the device. Each level of object may also employ different differentiation techniques. The combination of multiple techniques may improve and/or expand the number of objects that may be detected and combined to effect the resulting virtual environment.

The response signal may also include an indicator signal or header instruction that identifies the appropriate protocol, timing, frequency, coding, etc. methods such that the signal may be detected, read, and analyzed efficiently. The initial signal may be sent separately from the instruction information, such that the detector may receive the initial signal from multiple objects sequentially and/or simultaneously. After this initial signal, the instruction information may be received simultaneously and/or sequentially depending on the initial signal and/or the presence of other detected objects. The detector may also provide sending instructions back to the objects such that the objects may be read sequentially and/or simultaneously depending on the detected presence of other objects and the respective differentiation method. If more than one object is detected using the same protocol, frequencies, coding, etc., the objects may be instructed to use a delay, while objects without a similarly detected sending method can be sent simultaneously without delay. The header signal may be as simple as a single signal, such as for example a given frequency. Each frequency may be associated with the protocol, timing, frequency, coding, etc. methods used by that object. The detector may then receive and determine the presence and associated signal methods for the individual objects. Multiple objects using the same methods may be determined by the increased/decreased signal strength created by the presence of multiple signals. The detector may then send out an instruction frequency that is associated with the objects using duplicative methods. The signal may be a simple flag signal that alerts the object to use a pre-programmed delay before sending the response signal, or may send a specific delay time to individual objects. The objects employing the same sending methods may then be sent, received, detected, and analyzed sequentially. The objects using duplicative methods may also be configured to detect the presence of each other, i.e., the presence of another object using the same sending methods. The objects may then be pre-programmed or configured such that the objects determines a distinguishing sending method, timing, etc. such that the objects do not interfere.

In an exemplary embodiment, each level of object may employ a different protocol. Therefore, a primary program object may employ a different protocol than an enhancement or secondary object. For example, a primary program object may be physically and electrically coupled to the reader, while a first and/or secondary enhancement or modifying objects may be detected through NFC and/or Bluetooth. Objects within each enhancement level may also be combined using alternative differentiation techniques, such as those, for example, identified herein. The system can simultaneously process the different levels of detected objects by using one or more of the described techniques.

One or more physical objects may also be physically and electrically directly connected to each other to create one combined output signal. A processor in one or more of the objects may determine the presence of each of the physically detected objects to choose the appropriate signal to send to another object based on the detected signal. The processor may include an algorithm that supplies or combines code detected, received, or stored and associated with the connected object. The combined code is then turned into a wireless signal to be detected, processed, and possibly combined with other wireless signals by a reader and/or display. Accordingly, the wireless signal through, for example, NFC, may correspond to multiple objects but results in only one signal to be detected by the reader or display. Therefore, the multiple objects still effect the resulting virtual environment because the wireless signal is a composite of information, data, identifier(s), codes, instructions, etc. created from the physically detected objects.

In an exemplary embodiment, the objects may include orthogonal signals such that a received signal from one object does not interfere with a signal of another object. For example, each object or level of object may return signals at different frequencies or using different encoding methods. For electromagnetic excitation, one object may use FSK encoding with two different frequencies, while another object may use FSK encoding at two different frequencies, or may use ASK at the same or different frequencies. The different frequencies can be detected, filtered, and analyzed according to the associated encoding to create a resulting instruction set or application. For different encoding methods, the different instructions may be deciphered simultaneously or sequentially by different decoding methods. If a decoded response signal is invalid then another decoding method may be employed until a valid response is determined. Different orthogonal signals, methods, coding, etc. may also be used.

In an exemplary embodiment, signals of individual transmitted signals may be selected such that individual signals when combined create a new distinct signal that indicates the presence of the one or more combined objects. Therefore, through constructive or destructive interference, the new signal may indicate the presence of the individual components while providing a single signal to be read by the detector. The signals may be sent in designated timing windows or may be continuous signals. Through the selection of timing, on-off, frequency, phase shifting, amplitude selection, modulation, coding, etc. the signals may be created such that selected combination of physical objects creates individual, recognizable, and unique signals. A detector, reader, or display may then detect, receive, and analyze the single signal and extract the necessary information applicable to the combination of presented targets.

In an exemplary embodiment, each object may have a delayed response timer, such that the signals from different objects may be read sequentially. The delay timer may be randomized within the object such that the response time for each object is likely to occur at different and varying times. The delayed timer may alternatively be set depending on the associated object, such that the primary object may have an immediate response time, while secondary and tertiary objects may have sequentially delayed response times. The reader may then wait a predetermined amount of time to ensure all available objects have been detected and processed before presenting the virtual environment to a user.

As described herein targets may be used alone or in combination to create an associated virtual experience. The association of the individual targets with the respective virtual experience may be static and/or dynamic. For example, a given target may be static if its response to the virtual environment is the same with respect to the same virtual environment and/or the combination of other targets. Accordingly, the target may have the same identifiable response depending on the physical environment it is placed. Alternatively, the target may have a dynamic response if the associated application may be changed. The target response may be changed by user preferences, system upgrades, etc. The target may be dynamic, for example, if it is externally verified, such that the response of the system is retrieved from an external source that may be altered at a given time after system distribution.

Embodiments as described herein also provide a unique combination of targets associated with a unique virtual experience. The associated application of a combination of targets may or may not directly correspond to the combination of associated applications of the individual targets. In other words, the combination of individual parts may or may not equal the sum of those individual parts. For example, if two targets are combined to create a unique combination corresponding to a virtual experience, that virtual experience may or may not be equal to the combination of the virtual experiences provided by the individual targets. In an exemplary embodiment, an application associated with a combination of targets is greater than the sum of the applications associated with the individual targets. Accordingly, for example, a user may collect a number of targets. The targets may each provide access to one attribute of the application. However, once a user has collected and presented a threshold combination, such as a match set, to the reader, additional attributes of the application may be provided to the user. The virtual environment provided by the combination of targets is greater than that identified by the applications of the targets used singularly. As such, different combinations of targets may create individual and unique associated virtual environments independent of the virtual environment achieved by the individual target. The individual associations and/or the group associations may be static or dynamic and may be self-validated, system validated, or externally validated.

Figure 12:
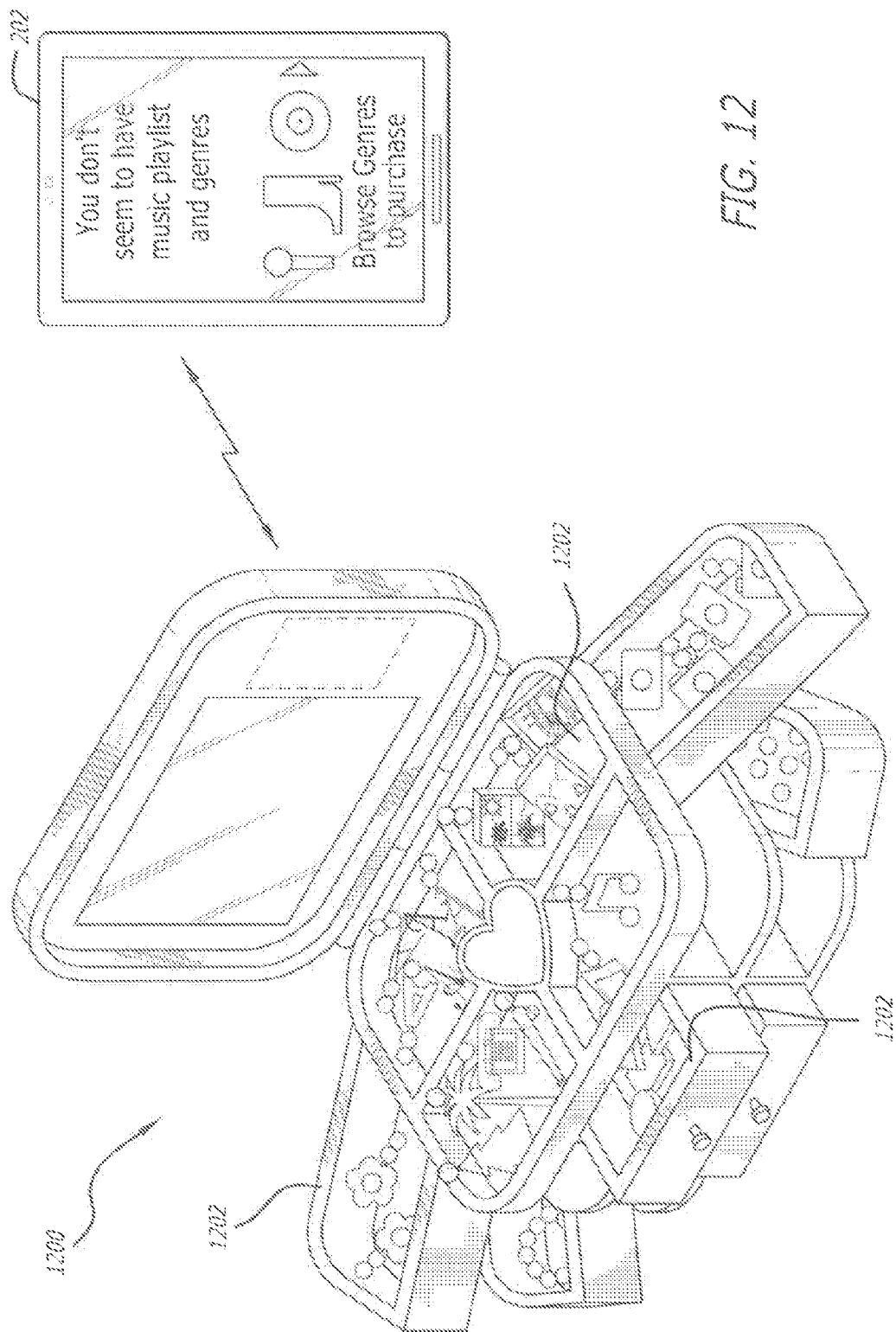
FIG. 12 illustrates an exemplary housing for holding physical objects, according to one embodiment.

FIG. 12 illustrates an exemplary housing for holding physical objects, according to one embodiment. A housing may be configured as a jewelry box 1200 to retain the one or more readers and targets as described above. The jewelry box 1200 may include one or more compartments 1202 for retaining either readers, targets, displays, or any combination thereof. The compartments may be specifically shaped or configured to indicate an association with an individual target, specific class of targets, or may be open to accommodate any one or more of the various targets or readers. The jewelry box 1200 may also include its own reader to determine the presence of one or more targets in the box. The jewelry box reader may communicate with either or both of the reader or display, thus linking the storage of the one or more targets with the active devices. For example, the jewelry box 1200 may detect the presence of the one or more targets stored within the box. The jewelry box 1200 may then communicate with either the active reader or display to provide an inventory of the box contents to the user. The inventory may indicate which other targets are available, but not present in the box. The inventory may also permit the user to purchase the missing targets directly through the inventory interface.

The housing for the one or more readers, targets, and/or display may be used to provide a sub-set of available applications associated with a given number of targets. The housing may, for example, detect and identify the targets in the possession of any one user. The housing may then identify the absence of one or more of the targets, such that the system may be aware of which targets are available for immediate use by a user. The system may then download the respective applications of those targets to either the reader or display.

In an exemplary embodiment, the associated applications to a given target may be stored in the cloud, i.e., the Internet for external storage. The housing may communicate directly to the reader and/or display to indicate which applications to download, or may provide an indication in the external storage site, such that the reader and/or display accessing the site receive an indication of which applications are desired. When the user couples the intended target to the reader, the reader merely unlocks or makes available that application to the display. The associated code is already ready for execution by either the reader or the display and the actual coupling of the target to the reader merely provides access to that application. The configuration, loading, and/or execution time may be shortened such that the user may experience faster response time in launching a given program. However, the system need not use the substantial memory and processing necessary to store, retrieve, and execute an applications associated with each and every possible target.

The reader and/or display may be configured to periodically access the external storage of the associated applications and download the desired application as indicated by a user through a direct interface or through the selection of one or more of the targets. The reader and/or display may also be configured to access and download the associated applications upon a signal received from the housing indicating the absence of one or more of the targets, or upon decoupling the reader and/or display from the housing. The housing may communicate directly with the external site indicating the desired applications after detecting the absence of one or more targets. The external site may then retain that information corresponding to the select user, such that when the reader and/or display of the user connects through intentional or period access to the external storage, the desired applications may be downloaded and/or installed.

Upon return of the targets to the housing, the applications associated with the target may be removed from the reader and/or display, thus freeing up memory for alternative applications. Upon return of the targets to the housing, information associated with the targets may be stored or backed-up in the housing, reader, display, targets, and/or external storage, such that a user may retain the status of the application and/or inputs of a user while using the application when the application of the target is removed from the reader and/or display.

Other storage mediums, such as the bracelet, reader, or display may be used in a similar fashion to pre-load a select subset of target applications. The detection or coupling of any specific target is then merely used to make available the application already stored to any of the reader or display. For example, the bracelet may comprise a detection device that identifies the presence of a number of target objects. The system retrieves the associated applications and stores the applications on either the reader and/or the display. The user may also use the configuration user interface to select a sub-set of applications available to the reader and identified through one or more target objects.

Exemplary embodiments are generally described above using physical objects to create, modify, view, or otherwise interact with a virtual environment. Virtual environments may be any application displayed on a screen. For example, an application may include programs for displaying photo galleries, taking pictures, playing music, keeping a journal, taking notes, keeping contact or friend information, video, voice, or text chatting with one or more other users, playing games, keeping or displaying time, keeping or displaying events or activities, etc. The different combination of physical objects may be used to create and modify the different virtual environments, thus creating a unique experience given the specific combination of physical objects in close proximity to the ready. One or more targets may be used to create a framework for a virtual environment, while another one or more targets may unlock, modify, or add to a given environment.

In exemplary embodiments, multiple objects are used to create a single combined effect. Different combinations of physical objects may be used to create individual and unique results or virtual experiences. The various physical objects may be combined in various combinations to create a unique physical object as well as a corresponding unique virtual experience or application. The combination, sub-combination, or recombination of the physical objects may be dynamically changed to create a corresponding dynamically changed virtual environment.

Embodiments described herein are directed toward affecting a virtual environment by manipulating physical objects. Embodiments as described herein may therefore be used as a method of visual coding. The combination of physical objects may be used to identify, distinguish, or identify the associated virtual environment through visual inspection of the combined physical objects. Accordingly, the physical objects may be shaped, colored, imaged, or otherwise include an identifying feature, description, or indication of the associated virtual effect. The combination of physical objects may be used as a self-displaying application, such that the physical objects identify the application created by the combined objects.

Traditionally, in order to manipulate a program or application, a person would have to enter in text or directions in the form of software code. The coder would then test the code to ensure that it performed as expected. The coder would have to read, write, and understand the associated syntax of the coding language (e.g., C++, Java, and Fortran). The coder could easily, and often did, incorporate unintended syntax errors or typographical errors resulting in run time errors with catastrophic effects that may prevent the program from compiling, executing, or running properly.

Embodiments as described herein can provide an easy way for coders to create and alter programs based on the physical manipulation of physical objects. As described herein the objects may relate to one or more associated codes to create, alter, or modify an application. The physical object may depict or illustrate the associated effect, code, or result related to the application. A user can select or combine one or more physical objects to create a desired application. The visual combination of the physical objects may be used to alert the user to the resulting program without requiring the ability to read, understand, or interpret any specific language or syntax. The presence and/or combination of the physical objects may indicate to a user the resulting program and/or associated program code used to implement, create, modify, alter, etc. an associate application or virtual environment. Accordingly, embodiments as described herein may be used as a method of programming that does not require any specific language or programming knowledge.

Figure 13:
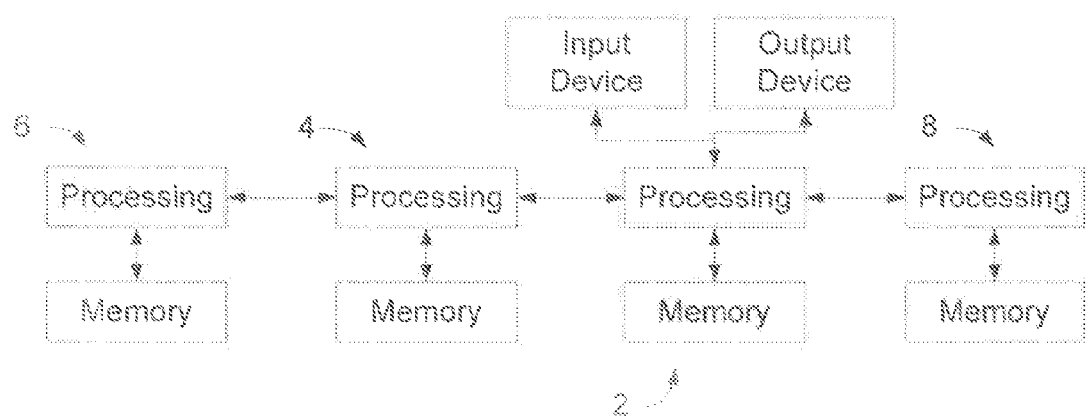
FIG. 13 illustrates an exemplary block diagram according to features of the present disclosure.

FIG. 13 illustrates an exemplary block diagram according to features of the present disclosure. Embodiments are described herein in terms of targets 6, readers 4, displays 2, and remote sources 8. The remote source may be the cloud, the Internet, a remote computer, and a server. Each of these components may include a power source, processor, memory, power supply, input, and/or output components. The components communicate directly or indirectly with one another through wired or wireless communication links (indicated by the arrows). The communication may be unidirectional or bi-direction. The communication link may also provide power. Features of any one component may be incorporated into another component, such that any one or more components may be independent or dependent on another component, for example, for processing, power, input, output, etc. One or more features may be excluded, added, or duplicated from any component, or transferred, combined, or sub-divided between one or more components and/or features. The processors and memory are configured such that the memory stores instructions that are executed by the processor. The memory may include any non-transitory machine readable storage medium capable of storing thereon a computer application comprising a routine of set instructions for causing the one or more components to perform steps according to embodiments described herein. The target 6, the reader 4, the display 2, or the remote source 8 may include individual programs and/or one or more pieces to a program that when executed by one or more of the components provides a virtual experience to a user. The virtual experience may be auditory, visual, or both. The application, program, or feature provided or associated with one or more components is not intending to be limiting, such that a component may be associated with any of one or more applications, programs, or features. The association may be dynamic or static.

While some specific embodiments of the present disclosure have been shown the present disclosure is not to be limited to these embodiments. For example, most functions performed by electronic hardware components may be duplicated by software emulation. Thus, a software program written to accomplish those same functions may emulate the functionality of the hardware components in input-output circuitry. The present disclosure is to be understood as not limited by the specific embodiments described herein, but only by scope of the appended claims. References to attachment, coupling, communicating, etc. are intended to encompass both direct and indirect features.

Logic including hardware, processes, software, and/or combinations thereof is disclosed herein. Hardware logic may be implemented with combination logic and finite state machines in a logic device. A logic device, for example, may include application specific integrated chip (ASIC), a field programmable gate array (FPGA), processors, or any combination thereof. Processing logic may comprise hardware (e.g., circuitry, dedicated logic, state machines), software that is run on a general purpose computer system or a dedicated machine, or a combination of both. Machine-readable medium is understood as a process occurring as a result of executing an application, a machine programmed to operate in accordance with the application, or a manufacture structurally and functionally interconnected with the application in a manner that enables the application to act as a computer component and realize functionality.

Although embodiments of this present disclosure have been fully described with reference to the accompanying drawings, it is to be noted that various changes and modifications will become apparent to those skilled in the art. Such changes and modifications are to be understood as being included within the scope of embodiments of this present disclosure as defined by the appended claims. For example, one or more components including physical objects comprising a display, a reader, a storage device, or a target are described. The storage device or target may be used to store one or more instructions to display, make available, create, unlock, control, modify, alter, configure, or enhance one or more applications. The reader may be used to wirelessly receive the instructions stored on the storage device and through physical or wireless communication with the display send that information to the display for illustration. The reader may then include the hardware and software necessary for reading, interpreting, receiving, and executing the data stored on the storage device. The communication reader may also provide power to the storage device, such that the storage device may be activated and send its data in response to the communication reader. However, the functions of the one or more components may be modified, combined, divided, subdivided or reconfigured such that the described features may be applied in one or more combinations. For example, the communication reader may be incorporated into the display, such that the storage device is wirelessly coupled to the display directly without an intermediate separate physical object. Numerical representations including first, second, primary, secondary, etc. is not intended to require a specific number of objects, but simply that one object or function of an object may be different from another object. The objects however may be combined such that a first object and second object performing different functions are encompassed in a single object capable of performing both functions. Similarly, the use of and, or herein is not intended to be limiting on the specific recitation of cited combinations. Therefore, the use of and, or is intended to include the other or any combination of the listed features or equivalents thereof, unless expressly stated otherwise.

While some specific embodiments of the present disclosure have been shown, the present disclosure is not to be limited to these embodiments. For example, most functions performed by electronic hardware components may be duplicated by software emulation. Thus, a software program written to accomplish those same functions may emulate the functionality of the hardware components in input-output circuitry. The present disclosure is to be understood as not limited by the specific embodiments described herein, but only by scope of the appended claims.

I claim:

1. A system comprising:
a screen;
a first target;
a reader that detects a presence of the first target within a predetermined proximity and communicates with the screen to display a first virtual environment based on the presence of the first target; and
a storage housing to hold the first target, the storage housing being configured to determine the pressence of the first target,
wherein the reader is configured to detect a presence of a second target within a predetermined proximity and communicate with the screen to display a second virtual environment different from the first virtual environment based on the presence of the first target and the second target.

2. The system of claim 1, wherein the screen, the first target, and the reader are separately housed.

3. The system of claim 2, wherein the first target is removably attachable to the reader.

4. The system of claim 3, wherein the reader is configured to alter an aspect of the first virtual environment based on the second target.

5. The system of claim 1, wherein the reader is configured to wireless communicate with the first target and the second target.

6. The system of claim 5, wherein the reader and first and second targets communicate using near field communication (NFC).

7. The system of claim 6, wherein the first target is associated with an application and the second target is associated with a feature of the application.

8. The system of claim 7, wherein the predetermined proximity is related to a physical distance corresponding to the attachment of the first target to the reader.

9. The system of claim 8, wherein the predetermined proximity is greater than the physical distance.

10. The system of claim 8, wherein the first target and reader are configured as jewelry.

11. The system of claim 10, wherein the reader is configured as a necklace pendant, and the first target is configured as a charm.

12. The system of claim 11, wherein the storage housing can hold the reader, and the second target, and wherein the storage housing is configured to determine the presence of the second target.

13. A method comprising:
detecting a first target within a proximity to a reader;
displaying a first virtual experience on a screen based on the first target detected by the reader;
detecting a second target by the reader; and
displaying a second virtual experience on the screen based on the first target and the second target,
wherein the second virtual experience comprises features of the first virtual experience
wherein the reader, the first target, and the second target can be placed into a storage housing that is configured to determine the presence of the first target and second target.

14. The method of claim 13, wherein the virtual experience is dependent upon the first target detected by the reader.

15. The method of claim 13, wherein the first virtual experience is different from the second virtual experience.

16. The method of claim 13, wherein the first target and the second target communicate wirelessly with the reader, and the reader communicates wirelessly with the screen, the first target communicating information to the reader corresponding to the first virtual experience.

17. The method of claim 16, wherein the first target, the second target, and the reader are worn as jewelry.

* * * * *